United States Patent
ter Horst et al.

(10) Patent No.: US 8,567,752 B2
(45) Date of Patent: Oct. 29, 2013

(54) ROTARY VALVE ACTUATORS HAVING PARTIAL STROKE DAMPING APPARATUS

(75) Inventors: Gerard ter Horst, Eibergen (NL); Erwin van Dorp, Bad Bentheim (DE)

(73) Assignee: Emerson Process Management, Valve Automation Inc., Waller, TX (US)

( * ) Notice: Subject to any disclaimer, the term of this patent is extended or adjusted under 35 U.S.C. 154(b) by 1045 days.

(21) Appl. No.: 12/552,814

(22) Filed: Sep. 2, 2009

(65) Prior Publication Data
US 2011/0049400 A1    Mar. 3, 2011

(51) Int. Cl.
*F16K 31/12* (2006.01)

(52) U.S. Cl.
USPC .............. 251/31; 251/48; 92/85 R; 92/85 B; 92/136

(58) Field of Classification Search
USPC ............. 251/31, 63.5, 47–48, 35–36, 58; 92/136, 68, 69 R, 73–75, 85 B, 85 R; 91/394–396, 186
See application file for complete search history.

(56) References Cited

U.S. PATENT DOCUMENTS

| | | | |
|---|---|---|---|
| 955,896 A | 4/1910 | Morrison | |
| 1,756,307 A | 4/1930 | Rowntree | |
| 2,500,777 A | 3/1950 | Timmerman, Jr. et al. | |
| 2,584,229 A * | 2/1952 | Sacchini | 91/7 |
| 2,609,836 A | 9/1952 | Knox | |
| 2,621,634 A * | 12/1952 | Carey | 91/7 |
| 2,781,861 A | 2/1957 | Lewis | |
| 3,092,083 A * | 6/1963 | Sheppard | 91/378 |
| 3,148,595 A | 9/1964 | Looney | |
| 3,150,489 A | 9/1964 | Dewar | |
| 3,213,760 A * | 10/1965 | Carr | 91/395 |
| 3,447,423 A * | 6/1969 | Henry | 91/395 |
| 3,776,100 A * | 12/1973 | Yeh | 91/409 |
| 3,831,500 A | 8/1974 | Kitamura et al. | |
| 4,034,958 A * | 7/1977 | Masclet | 251/28 |
| 4,043,254 A | 8/1977 | Jaeger | |
| 4,257,313 A * | 3/1981 | Sheppard | 91/422 |
| 4,543,977 A * | 10/1985 | Arav | 137/115.17 |
| 4,564,169 A | 1/1986 | Nordlund | |

(Continued)

FOREIGN PATENT DOCUMENTS

| | | |
|---|---|---|
| DE | 19532457 | 3/1997 |
| DE | 10357911 | 7/2005 |

(Continued)

OTHER PUBLICATIONS

Remote Control, "Pneumatic Actuators Installation and Maintenance Instructions", published Feb. 2004, 4 pages.

(Continued)

*Primary Examiner* — John K Fristoe, Jr.
*Assistant Examiner* — Marina Tietjen
(74) *Attorney, Agent, or Firm* — Hanley, Flight & Zimmerman, LLC.

(57) ABSTRACT

Rotary valve actuators having partial stroke damping apparatus are described herein. An example rotary valve actuator described herein includes a housing containing a first piston and a second piston opposite the first piston, where the pistons move in opposite directions to rotate a shaft of the rotary valve actuator. A damper is operatively coupled to at least one of the first piston or the second piston to slow the movement of the piston for only a portion of a stroke of the rotary valve actuator.

22 Claims, 16 Drawing Sheets

(56) References Cited

U.S. PATENT DOCUMENTS

| | | | |
|---|---|---|---|
| 4,948,103 | A | 8/1990 | Bowden et al. |
| 5,269,339 | A | 12/1993 | Szatmary |
| 5,323,884 | A * | 6/1994 | Machino .................. 188/312 |
| 5,385,218 | A | 1/1995 | Migliori |
| 6,003,432 | A * | 12/1999 | Laulhe ..................... 92/69 R |
| 6,155,531 | A | 12/2000 | Holborow et al. |
| 6,482,265 | B1 | 11/2002 | Falck et al. |
| 6,651,687 | B2 | 11/2003 | Taylor |
| 6,776,083 | B2 | 8/2004 | Helasuo et al. |
| 6,840,493 | B2 | 1/2005 | York et al. |
| 7,228,784 | B2 * | 6/2007 | Hoch et al. ..................... 92/74 |
| 7,377,479 | B1 | 5/2008 | Chen |
| 2001/0018864 | A1 | 9/2001 | Hirano et al. |
| 2002/0174766 | A1 | 11/2002 | Norton et al. |
| 2005/0092171 | A1 * | 5/2005 | Shu ............................ 92/72 |
| 2010/0018387 | A1 * | 1/2010 | Miyazawa ................. 92/136 |
| 2010/0139475 | A1 * | 6/2010 | Plavnik ...................... 91/55 |

FOREIGN PATENT DOCUMENTS

| | | |
|---|---|---|
| FR | 2781861 | 2/2000 |
| GB | 1372392 | 10/1974 |
| JP | H01106606 | 7/1989 |
| JP | 01295008 | 11/1989 |
| JP | 01303304 | 12/1989 |

OTHER PUBLICATIONS

International Searching Authority, "International Search Report," issued in connection with counterpart international application serial No. PCT/US2010/047151, mailed Mar. 24, 2011, 4 pages.

International Searching Authority, "Written Opinion of the International Searching Authority," issued in connection with counterpart international application serial No. PCT/US2010/047151, mailed Mar. 24, 2011, 8 pages.

International Bureau, "International Preliminary Report on Patentability," issued in connection with international application serial No. PCT/US20101047151, mailed Mar. 15, 2012, 10 pages.

* cited by examiner

ROTARY VALVE ACTUATORS HAVING PARTIAL STROKE DAMPING APPARATUS

FIELD OF THE DISCLOSURE

This patent relates generally to actuators and, more particularly, to rotary valve actuators having partial stroke damping apparatus.

BACKGROUND

Process control plants or systems often employ rotary valves such as, for example, butterfly valves to control the flow of process fluids. In general, rotary valves typically include a fluid flow control member disposed in a fluid flow path between an inlet and an outlet of the rotary valve. The fluid flow control member is rotatably coupled relative to a valve body of the rotary valve via a shaft. Typically, a portion of the shaft extending from the rotary valve is operatively coupled to an actuator (e.g., a pneumatic actuator, a hydraulic actuator, etc.) that rotates the valve shaft in a first direction and a second direction opposite the first direction.

In operation, a control unit (e.g. a positioner) may supply a control fluid (e.g., air) to the actuator to position the fluid flow control member to a desired position to regulate or throttle the flow of fluid through the rotary valve. The actuator may move the fluid flow control member through a complete stroke between a fully open position to allow fluid flow through the valve and a fully closed position to prevent fluid flow through the valve.

Rotary valve actuators such as rack and pinion type actuators are often used to implement, for example, quarter-turn rotary valves. A rack and pinion type actuator converts rectilinear motion of two opposing pistons into rotational motion of the valve shaft. Rack and pinion type actuators often provide a relatively high output torque and a compact physical envelope or footprint. However, rack and pinion actuators may require a damping mechanism to provide a cushioning and/or deceleration effect to prevent noise, shock and/or damage to the components of the actuator.

However, some known damping mechanisms used with rotary actuators dampen the movement of the actuator over an entire stroke of the actuator. For example, such known damping mechanisms may dampen or reduce the speed of the pistons over an entire closing stroke. Such a configuration significantly reduces the efficiency of the actuator and significantly reduces or limits the overall closing speed and output torque provided by the actuator.

SUMMARY

An example rotary valve actuator described herein includes a housing containing a first piston and a second piston opposite the first piston, where the pistons move in opposite directions to rotate a shaft of the rotary valve actuator. A damper is operatively coupled to at least one of the first piston or the second piston to slow the movement of the piston for only a portion of a stroke of the rotary valve actuator.

In another example, a damping apparatus for use with a rotary valve actuator includes a valve shaft operatively coupled to a rotary valve actuator in which the rotary valve actuator rotates the valve shaft in a first direction and a second direction opposite the first direction. A cam is coupled to an end of the valve shaft. A viscosity damper is coupled to a housing of the rotary valve actuator. The viscosity damper includes a movable member that is to be engaged by the cam over only a portion of a stroke of the rotary valve actuator.

DETAILED DESCRIPTION

The example actuator apparatus described herein may be used with, for example, rotary valves (e.g., quarter-turn valves). The example actuator apparatus described herein are implemented with a damper to slow the speed of the actuator for only a portion of the full stroke of the actuator. More specifically, the example actuator apparatus described herein provide partial stroke damping at, for example, an end of a closing stroke as the actuator moves a flow control member of a rotary valve between an open position and a closed position. The example actuator apparatus may be a double-acting actuator, a single-acting actuator, a scotch yolk actuator, a vane-type actuator, or any other suitable rotary actuator.

In general, the example damping apparatus described herein are operatively coupled to an actuator to provide damping for only a portion of the full stroke of the actuator. In one example, the damping apparatus includes a damper operatively coupled to at least one of a first piston or a second piston of the actuator to slow the movement of the pistons for only a portion of a stroke of the actuator. Examples of such apparatus are described in greater detail below in connection with FIGS. 5A-5B, 6A-6C, 9-17. Additionally, in some examples, the damping apparatus also includes a first fluid circuit and path and a second fluid circuit or path in fluid communication with the inner chamber of the actuator. Examples of such apparatus are described below in greater detail in connection with FIGS. 4A-4E, 7 and 8.

In contrast to the example damping apparatus described herein, some known actuator apparatus implement a flow restrictor in an exhaust path of the actuator to provide stroke damping. However, such known stroke damping apparatus slow the speed of the pistons over an entire stroke (e.g., a full closing stroke) of the actuator, thereby affecting actuator efficiency and performance. Additionally, such known damping apparatus are often mounted externally relative to a housing of the actuator, which increases the overall physical or dimensional envelope or footprint of the actuator.

Figure 1A:
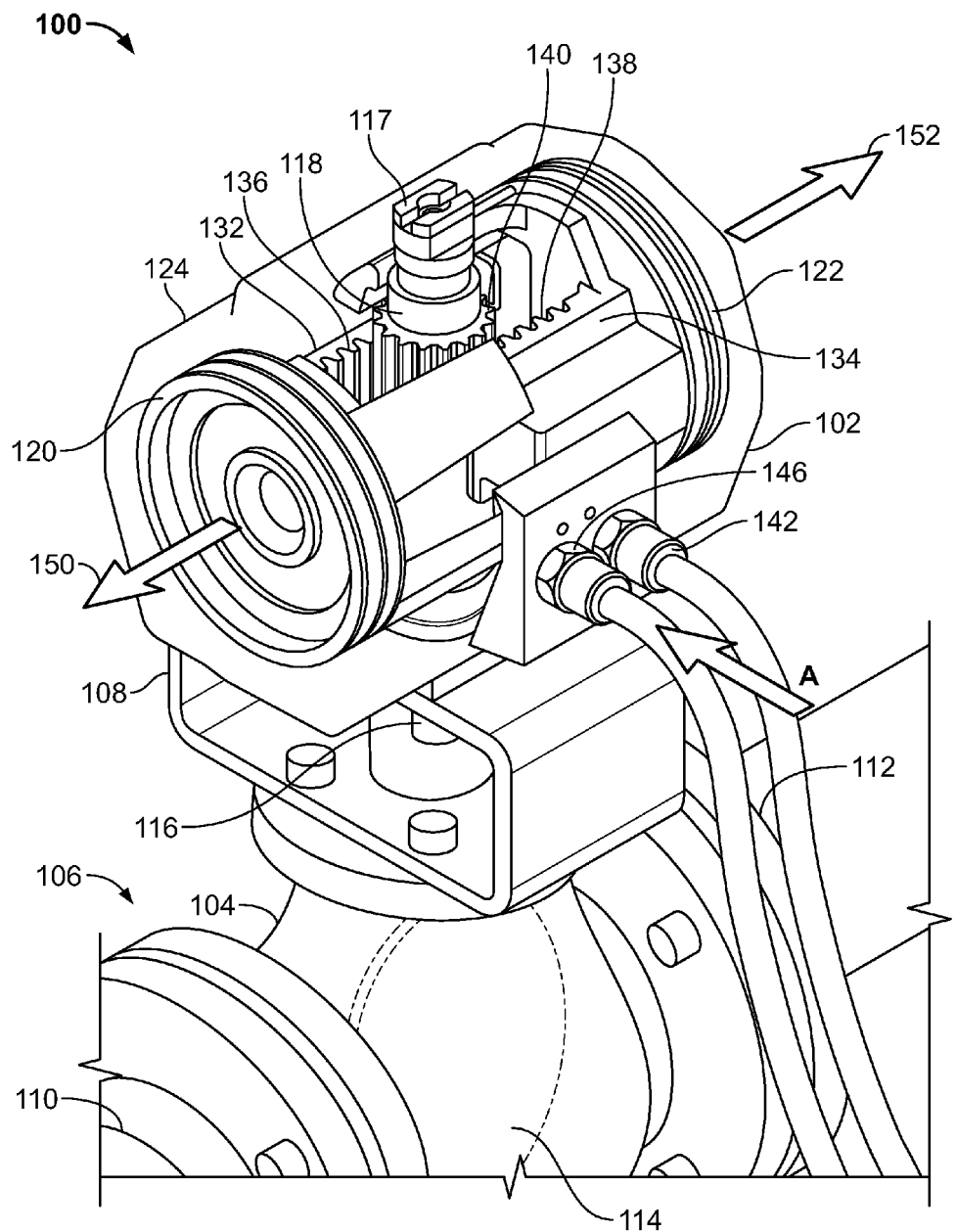
FIGS. 1A-1B illustrate a known double-acting, rotary valve actuator.
Figure 1B:
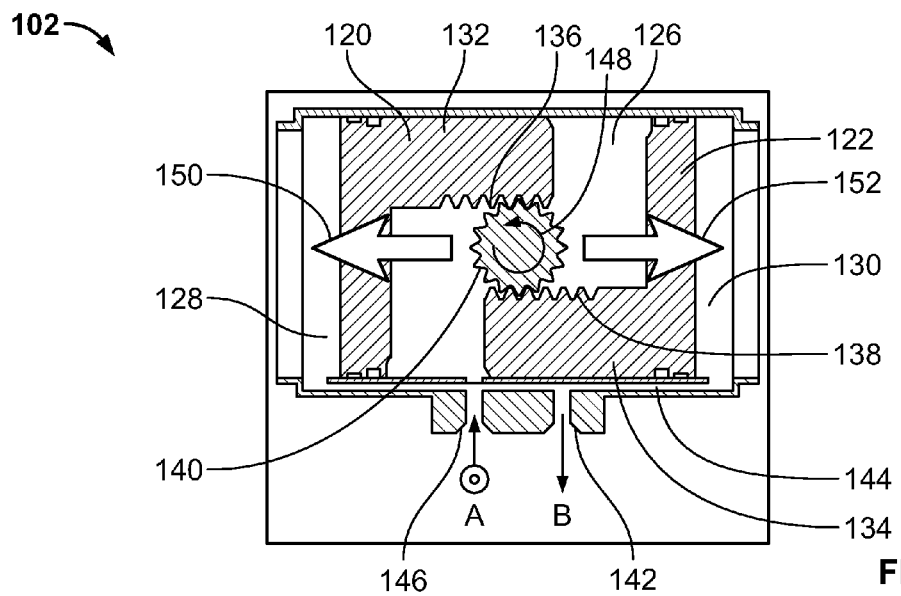

Before discussing the example actuators having partial stroke damping apparatus in detail, a brief description of a known rotary control valve assembly 100 is provided in FIGS. 1A and 1B. Referring to FIGS. 1A and 1B, a rotary valve actuator 102 (e.g., a rack and pinion type actuator) is coupled to a valve body 104 of a rotary valve 106 via a bonnet 108. The valve body 104 defines a fluid flow path between an inlet 110 and an outlet 112. A fluid flow control member 114 is disposed within the fluid flow path to regulate the flow of fluid between the inlet 110 and the outlet 112. The flow control member 114 is rotatably coupled relative to a valve seat (not shown) disposed within the valve body 104 via a valve shaft 116. As shown, an end 117 of the valve shaft 116 is operatively coupled to the actuator 102 via a drive shaft 118 of the actuator 102.

The actuator 102 includes a first piston 120 and a second piston 122 disposed within a housing 124 to define an inner control chamber 126 and respective outer control chambers 128 and 130. The pistons 120 and 122 include respective body portions 132 and 134 having racks or gears 136 and 138 to engage a pinion 140 of the drive shaft 118. The housing 124 includes a first port 142 in fluid communication with the outer control chambers 128 and 130 via a passageway 144 defined by the housing 124. The housing 124 also includes a second port 146 in fluid communication with the inner control chamber 126 to provide and/or remove pressurized fluid from the inner control chamber 126.

Figure 2:
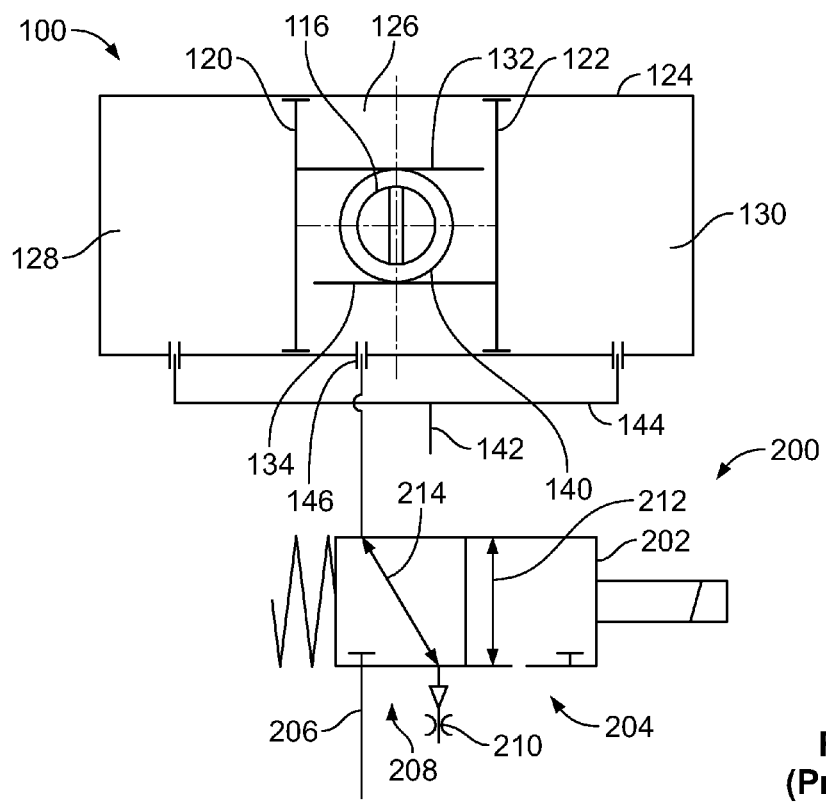
FIG. 2 illustrates a known damping apparatus operatively coupled to the rotary valve actuator of FIGS. 1A-1B.

FIG. 2 schematically illustrates a known damping apparatus 200 operatively coupled to the known rotary control valve assembly 100 of FIGS. 1A and 1B. Referring to FIG. 2, the damping apparatus 200 includes a solenoid valve 202 mounted externally relative to the actuator 102. The solenoid valve 202 moves between a first position 204 to fluidly couple the second port 146 and the inner control chamber 126 to a fluid supply source 206 and a second position 208 to fluidly couple the second port 146 and the inner control chamber 126 to a fluid flow restrictor 210. In this example, in contrast to the example damping apparatus described herein, the known damping apparatus 200 dampens or slows the stroke speed of the pistons 120 and 122 for a full or complete stroke (e.g., an entire closing stroke) of the actuator 102 when the pistons 120 and 122 move toward the valve shaft 116.

In operation, referring to FIGS. 1A, 1B, and 2, the inner chamber 126 and the outer control chambers 128 and 130 receive pressurized fluid to move the pistons 120 and 122 in a rectilinear motion away from and toward the valve shaft 116. The rectilinear motion of the pistons 120 and 122 is converted to rotational motion of the valve shaft 116 via the racks 136 and 138 and the pinion 140 as the pistons 120 and 122 move in opposite directions within the housing 124. Rotation of the valve shaft 116 causes the flow control member 114 to rotate to a desired angular position to vary or regulate the fluid flow through the valve 106. For example, rotation of the valve shaft 116 in a first direction (e.g., a counterclockwise direction) moves a flow control member 114 of the valve 106 to an open position to allow or increase fluid flow through the valve 106 and rotation of the valve shaft 116 in a second direction (e.g., a clockwise direction) moves the flow control member of the valve 106 to a closed position to decrease or prevent fluid flow through the valve 106.

To rotate the valve shaft 116 in a first direction (e.g., a counterclockwise direction) indicated by arrow 148 of FIG. 1B, the solenoid valve 202 is moved to the first position 204 to fluidly couple the fluid supply source 206 to the inner control chamber 126 of the actuator 102. The inner control chamber 126 receives pressurized fluid (e.g., compressed air) from the fluid supply source 206 via a first fluid pathway 212 and the second port 146. A control fluid (e.g., air) provided in the inner control chamber 126 via the second port 146 having a pressure greater than a pressure of a fluid (e.g., air) in the outer control chambers 128 and 130 displaces the pistons 120 and 122 in a direction indicated by arrows 150 and 152 and causes the valve shaft 116 to rotate in the first direction 148. Any fluid in the outer control chambers 128 and 130 is vented via the passageway 144 of the housing 124 and the first port 142.

To rotate the valve shaft 116 in a second direction opposite the first direction 148, the damping apparatus 200 is moved to the second position 208 to fluidly couple the inner control chamber 126 to the fluid flow restrictor 210 via a second fluid pathway 214. The pressurized fluid from the inner control chamber 126 is vented via the second port 146 and pressurized fluid is provided in the outer control chambers 128 and 130 via the first port 142 and the passageway 144. The pressurized fluid in the outer control chambers 128 and 130 causes the pistons 120 and 122 to move toward the valve shaft 116 (e.g., a closing stroke) to cause the valve shaft 116 to rotate in the second direction (e.g., a clockwise direction). As the pistons 120 and 122 move toward the valve shaft 116, the fluid flow restrictor 210 restricts the flow of the fluid through the second fluid pathway 214. As a result, the motion or the speed of the pistons 120 and 122 is reduced or dampened for a full stroke of the actuator 102 in which the pistons 120 and 122 are moving toward the valve shaft 116 (e.g., a complete closing stroke).

In contrast to the example damping apparatus described herein, the known damping apparatus 200 includes the fluid flow restrictor 210 in a configuration that is disadvantageous because the damping apparatus 200 dampens or reduces the speed of the pistons 120 and 122 over substantially an entire or complete stroke for which the pistons 120 and 122 move toward the valve shaft 116. Thus, the damping apparatus 200 restricts the stroke speed over the complete stroke, thereby significantly affecting the performance and the efficiency of the actuator 102. Additionally, the damping apparatus 200 is mounted externally relative to the housing 124 of the actuator 102, thereby increasing the overall dimensional envelope of the rotary control valve assembly 100.

Figure 3:
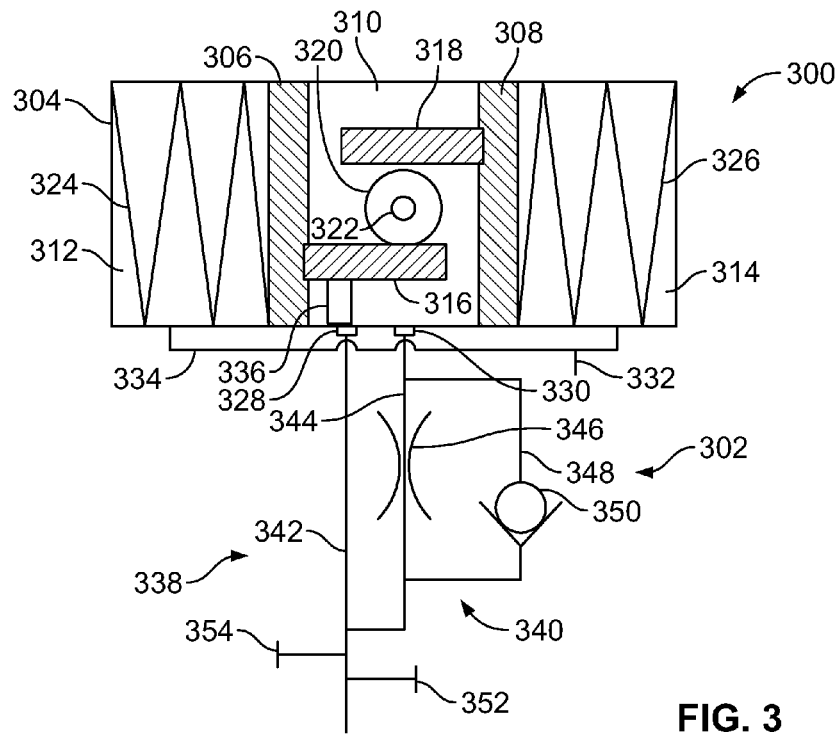
FIG. 3 illustrates an example actuator having an example damping apparatus described herein.

FIG. 3 illustrate an example rotary valve actuator 300 having a damping apparatus 302 described herein. The example damping apparatus 302 described herein may be used with double-acting actuators, single-acting actuators, rack and pinion actuators, scotch yolk actuators, vane actuators or any other suitable actuator(s).

In this example, the example actuator 300 is a single-acting, rack and pinion type actuator. The actuator 300 includes a housing 304 having a first piston 306 and a second piston 308 disposed therein to define an inner chamber 310, a first outer chamber 312 and a second outer chamber 314. The first and second pistons 306 and 308 include respective body or rack portions 316 and 318 that engage a drive shaft or pinion 320 of a valve shaft 322. The valve shaft 322 is operatively coupled to a fluid flow control member (e.g., the fluid flow control member 114 of FIG. 1A) of a valve (e.g., the rotary valve 106). Biasing elements or springs 324 and 326 are disposed within the respective outer chambers 312 and 314 of the housing 304 to bias the pistons 306 and 308 toward the valve shaft 322. In this example, the housing 304 includes a first port 328 and a second port 330 in fluid communication with the inner chamber 310. The housing 304 also includes a third port 332 in fluid communication with the outer chambers 312 and 314 via a passageway 334.

In general, the damping apparatus 302 slows the motion of the pistons 306 and/or 308 over only a portion of a stroke of the actuator 300. In this example, the damping apparatus 302 includes a damper or blocking element 336 operatively coupled to the first piston 306. The first piston 306 moves the damper 336 between a first position to enable fluid flow between the inner chamber 310 and the first port 328 and a second position to substantially restrict fluid flow between the inner chamber 310 and the first port 328 over a portion of the stroke of the actuator 300. For example, the damper 336 may be configured to block or restrict fluid flow through the first port 328 over only a portion of the actuator stroke during which the fluid in the inner chamber 310 is removed or exhausted to a vent 352.

Additionally, in this example, the damping apparatus 302 also includes a first fluid circuit 338 and a second fluid circuit 340. In this example, the first fluid circuit 338 includes a first fluid pathway 342 fluidly coupled to the inner chamber 310 of the housing 304 via the first port 328. The second fluid circuit 340 includes a second fluid pathway 344 fluidly coupled to the inner chamber 310 via the second port 330. The second fluid circuit 340 also includes a restrictor 346 such as, for example, a fluid restrictor (e.g., a bleed valve) to restrict the fluid flow through the second fluid pathway 344. In other words, the restrictor 346 restricts fluid flow through the second fluid pathway 344 so that fluid flow through the second fluid pathway 344, when the first piston 306 is in the second position (e.g., the damper 336 is restricting fluid flow through the first port 328), is less than the fluid flow between the inner chamber 310 and the first port 328 when the damper 336 is positioned away from the first port 328. The restrictor 346 may be adjustable to increase or decrease the restriction (e.g., the rate of fluid flow) through the second fluid pathway 344.

Additionally, in this example, the damping apparatus 302 includes a third fluid pathway 348 having a one-way valve 350 (e.g., a check valve) that allows fluid flow in a first direction and which substantially restricts or prevents fluid flow in a second direction opposite the first direction. In this example, the third fluid pathway 348 is fluidly coupled to the inner chamber 310 via the second port 330. However, in other examples, the third fluid pathway 348 may be fluidly coupled to the inner chamber via the first port 328. In yet other examples, the one-way valve 350 may be integrally formed with the damper 336.

Figures 14, 15:
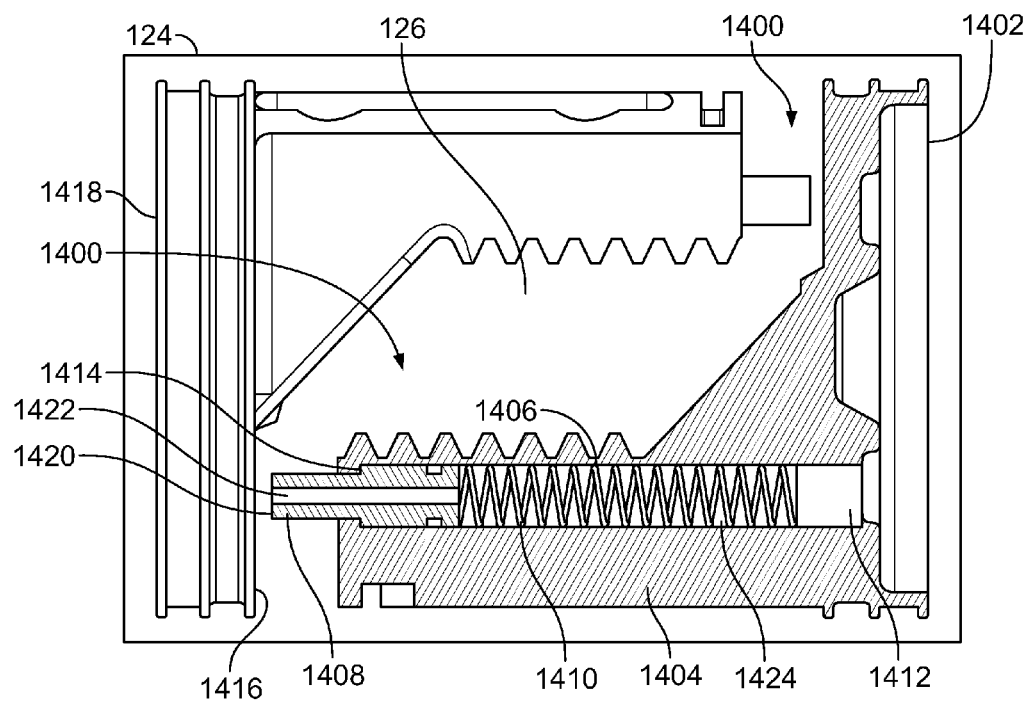

Although the first and second fluid circuits 338 and 340 are schematically illustrated, the first and second fluid circuits 338 and 340 may be integrally formed with, disposed within, or coupled to the housing 304, the ports 328 and/or 330, and/or the pistons 306 and 308. For example, the restrictor 346 and/or the one-way valve 350 may be disposed within the second port 330, within the housing 304, and/or coupled to the piston 306 (e.g., disposed within the body portion 316). For example, the restrictor 346 and the one-way valve 350 may be integrally formed with the damper 336. Such an example is illustrated in FIGS. 5A-5E and 6A-6B. In another example, the one-way valve 350 may be integrally formed with the damper 336 and the restrictor 346 may be disposed within the second port 330. Such an example is illustrated in FIGS. 7A-7C and FIG. 8. In yet another example, the one-way valve 350 and the restrictor 346 may be disposed within the body portion 316 of the piston 306. Such an example is illustrated in FIG. 15.

As shown, the first fluid pathway 342 fluidly couples the inner chamber 310 of the actuator 300 to, for example, the vent 352. The third fluid pathway 348 fluidly couples the inner chamber 310 to a fluid supply source 354 (e.g., a compressed air supply source). The one-way valve 350 enables fluid flow in a first direction from the fluid supply source 354 to the inner chamber 310 (e.g., when a supply fluid is provided in the inner chamber 310) and prevents fluid flow in a second direction from the inner chamber 310 to the vent 352 (e.g., when the fluid is removed or exhausted from the inner chamber 310). The restrictor 346 of the second fluid pathway 344 substantially restricts or decreases the rate of fluid flow flowing through the second fluid pathway 344 when the fluid is removed or exhausted from the inner chamber 310 as described below. In other examples in which the restrictor 346 and the one-way valve 350 are integrally formed with the damper 336, the second port 330 and/or the second and third fluid pathways 344 and 348 are not required.

The inner chamber 310 receives pressurized fluid (e.g., compressed air) from the fluid supply source 354 to move the pistons 306 and 308 in a first direction opposite the forces provided by the biasing elements 324 and 326 (e.g., an opening stroke). The inner chamber 310 may receive the pressurized fluid via the third fluid pathway 348 and the second port 330. For example, if the damper 336 is blocking the first port 328, pressurized fluid from the fluid supply source 354 cannot freely flow to the inner chamber 310 via the first fluid pathway 342. Instead, the one-way valve 350 moves to an open position via the pressure of the supply fluid to enable the pressurized fluid to flow between the fluid supply source 354 and the inner chamber 310 via the third fluid pathway 348. The outer chambers 312 and 314 may be vented to the atmosphere via the passageway 334 and the third port 332 so that the pressure of the inner chamber 310 need only overcome the forces exerted by the respective biasing elements 324 and 326.

When the pressurized fluid is removed from the inner chamber 310, the biasing elements 324 and 326 bias or move the pistons 306 and 308 toward the valve stem 322 (e.g., a closing stroke). As the pistons 306 and 308 move toward the valve stem 322, the fluid in the inner chamber 310 flows primarily between the first port 328 and the vent 352 via the first fluid pathway 342 for a first predetermined length of the stoke (e.g., 80% of the stroke). When the damper 336 is positioned away from the first port 328, the fluid in the inner chamber 310 flows primarily through the first fluid pathway 342 because of the increased flow resistance provided by the restrictor 346 in the second fluid pathway 344.

However, as the pistons 306 and 308 move toward the valve stem 322 over a second predetermined length of the stroke (e.g., the remaining 20% of the stroke), the first piston 306 moves the damper 336 in a position that blocks the first port 328 to substantially restrict or prevent fluid flow through the first fluid pathway 342. As a result, fluid in the inner chamber 310 flows to the vent 352 primarily via the second port 330 and the second fluid pathway 344. As noted above, the one-way valve 350 prevents fluid flow from the inner chamber 310 to the vent 352 via the third fluid pathway 348. Instead, the fluid in the inner chamber 310 flows to the vent 352 via the second fluid pathway 344, where the restrictor 346 restricts the rate of fluid flow through the second fluid pathway 344. When the damper 336 is blocking the first port 328, the fluid flows primarily through the second fluid pathway 344 because the restrictor 346 provides a restriction through the second fluid pathway 344 that is less than the flow restriction between the inner chamber 310 and the first port 328 when the damper 336 is blocking the first port 328. In this manner, the speed of the pistons 306 and 308 is reduced or dampened (i.e., the movement of the pistons 306 and 308 is slowed) over the second predetermined length of the stroke, providing a partial stroke damping as the pistons 306 and 308 move toward the valve shaft 322 (e.g., a portion of a closing stroke of the actuator 300).

Therefore, the first piston 306 moves the damper 336 between a first position to enable fluid flow between the inner chamber 310 and the first port 328 and a second position to substantially restrict fluid flow between the inner chamber 310 and the first port 328 over only a portion of the stroke of the actuator 300. In other words, the damper 336 enables fluid flow through the first fluid pathway 342 as the fluid in the inner chamber 310 is removed or exhausted over a first predetermined portion of the stroke (e.g., 80% of a closing stroke) and substantially restricts fluid flow through the first fluid pathway 342 over a second predetermined portion of the stroke (e.g., 20% of a closing stroke). When the first port 328 is blocked by the damper 336, fluid in the inner chamber 310 flows to the vent 352 via the second fluid pathway 344 and the restrictor 346. In this manner, the speed of the actuator stroke is only reduced over the second predetermined length of the stroke (e.g., an end of a closing stroke).

Although not shown, the damper 336 may be sized so that in the first position the damper 336 blocks the first port 328 over a larger portion (e.g., 30%) or a smaller portion (e.g., 10%) of the full stroke of the rotary valve actuator 300. In yet other examples, the damping apparatus 302 may include a first damper disposed adjacent a second damper to increase an amount or length of the partial stroke for which the first and second dampers block the first port 328.

Figure 4A:
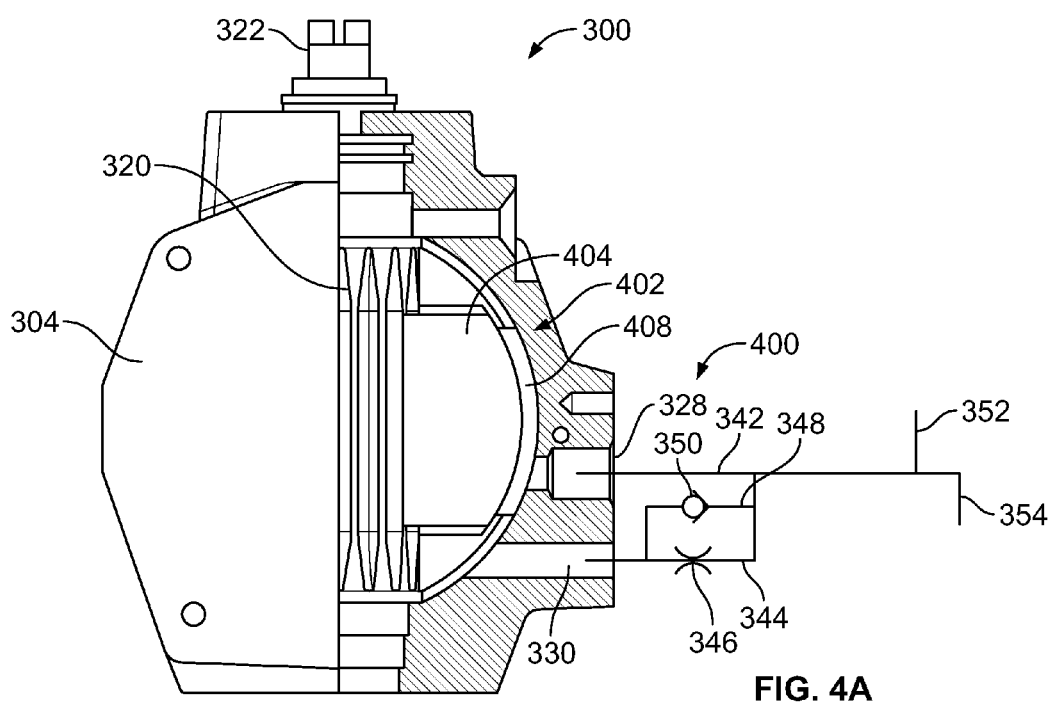
FIGS. 4A-4D illustrate another example damping apparatus described herein that can be used to implement the example actuator of FIGS. 3A-3B.
Figure 4B:
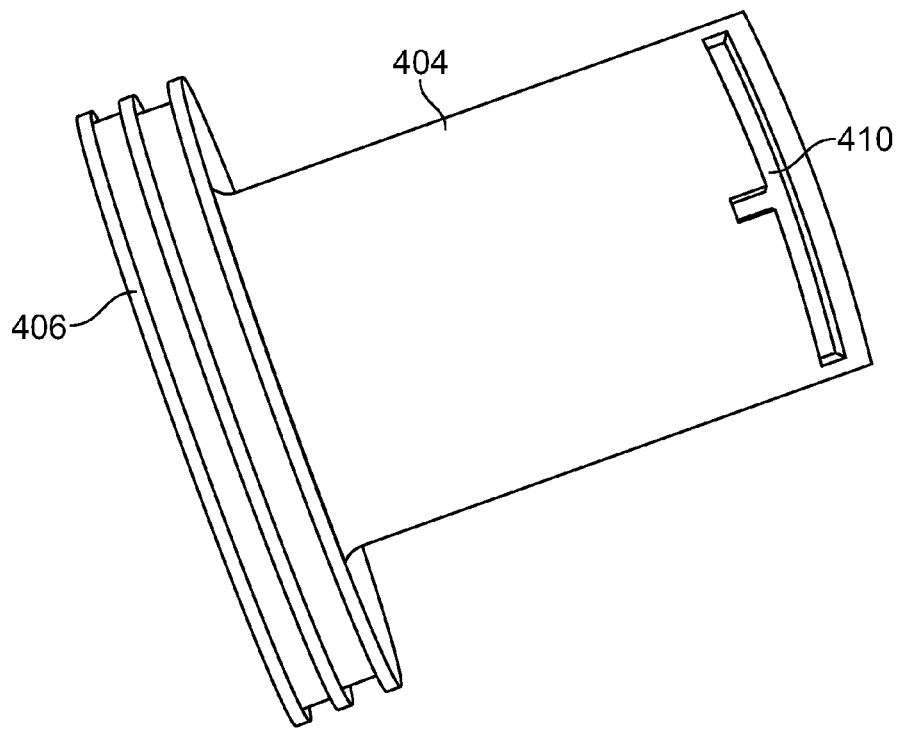
Figure 4C:
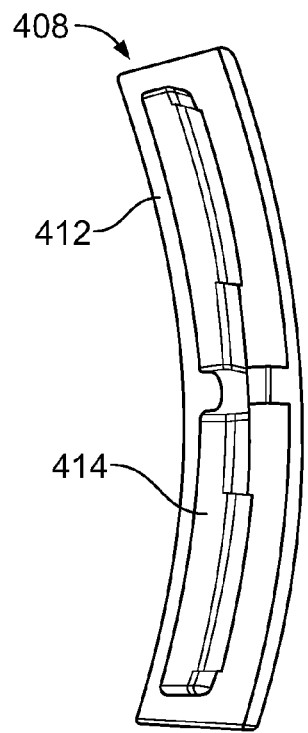
Figure 4D:
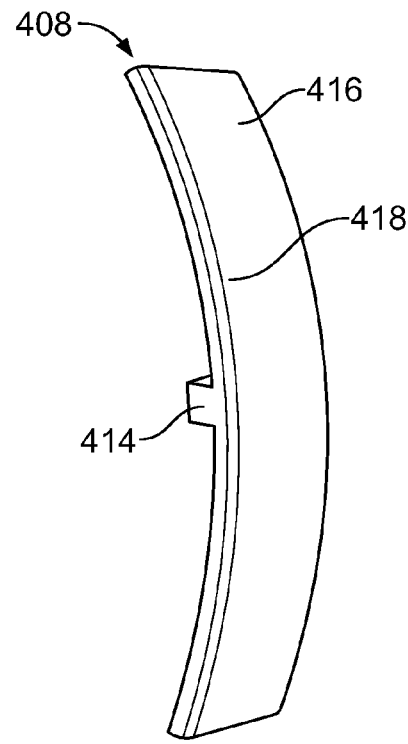

FIGS. 4A-4D illustrate an example damping apparatus 400 that may be used to implement, for example, the example rotary valve actuator 300 of FIG. 3. FIG. 4A illustrates a partial cutaway view of the example housing 304 of FIG. 3. In this example, the damping apparatus includes a damper 402 operatively coupled to a body portion 404 of a piston 406. Referring to FIGS. 4B-4D, the damper 402 is a pad or a bearing 408 coupled (e.g., via press fit or interference fit, etc.) to a slot or opening 410 of the body portion 404 of the piston 406. The pad 408 may be made of an elastomeric material, a plastic material, a metallic material, and/or any other suitable material(s). As shown in FIG. 4C, a first side 412 of the example pad 408 includes protruding members 414 that fit tightly within the slot 410 of the body portion 404. A second side 416 of the pad includes a surface 418 (e.g., a relatively smooth surface, a relatively rough surface) that is to restrict fluid flow through the first port 328 over only a portion of the actuator stroke as the piston 406 moves toward the valve shaft 322 (e.g., a portion of a closing stroke of the actuator 300).

The operation the example damping apparatus 400 is similar to the function or operation of the example damping apparatus 302 described above in connection with FIG. 3 and, thus, will not be repeated. Instead, the interested reader is directed to the description described above in connection with FIG. 3.

Figure 5A:
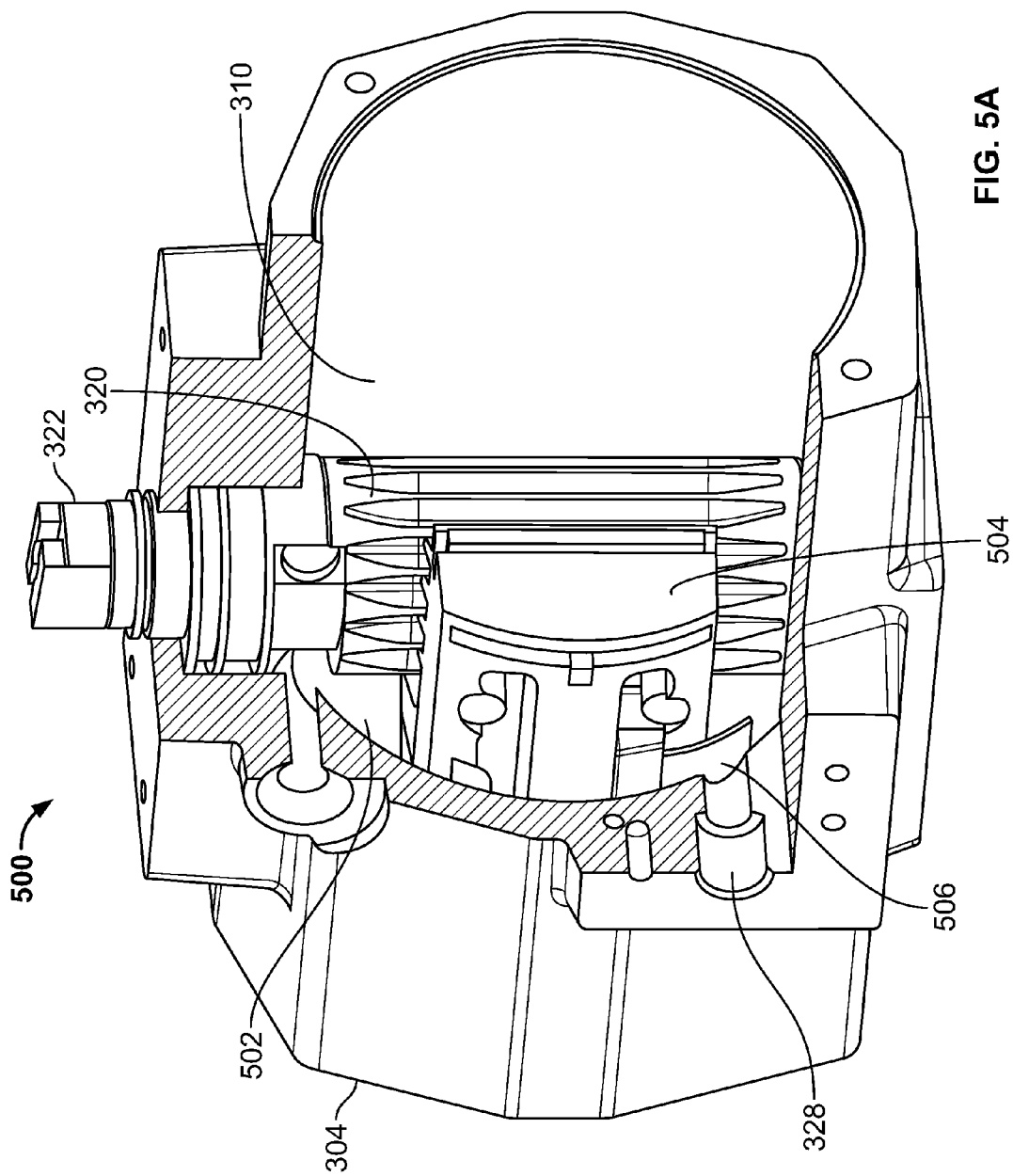
FIGS. 5A-5E illustrate another example damping apparatus described herein that can be used to implement the example actuator of FIGS. 3A-3B.

FIGS. 5A-5E illustrate another example damping apparatus 500 described herein that may be used to implement, for example, the example rotary valve actuator 300 of FIG. 3. As shown in FIG. 5A, the example damping apparatus 500 includes a piston 502 disposed within the housing 304 of the actuator 300. The piston 502 includes a body or rack portion 504 operatively coupled to the drive shaft or pinion 320 of the valve shaft 322. In this example, the damping apparatus 500 includes a damper or blocking element 506 operatively coupled (e.g., via press fit, interference fit, etc.) to the body portion 504 of the piston 502.

Figure 5B:
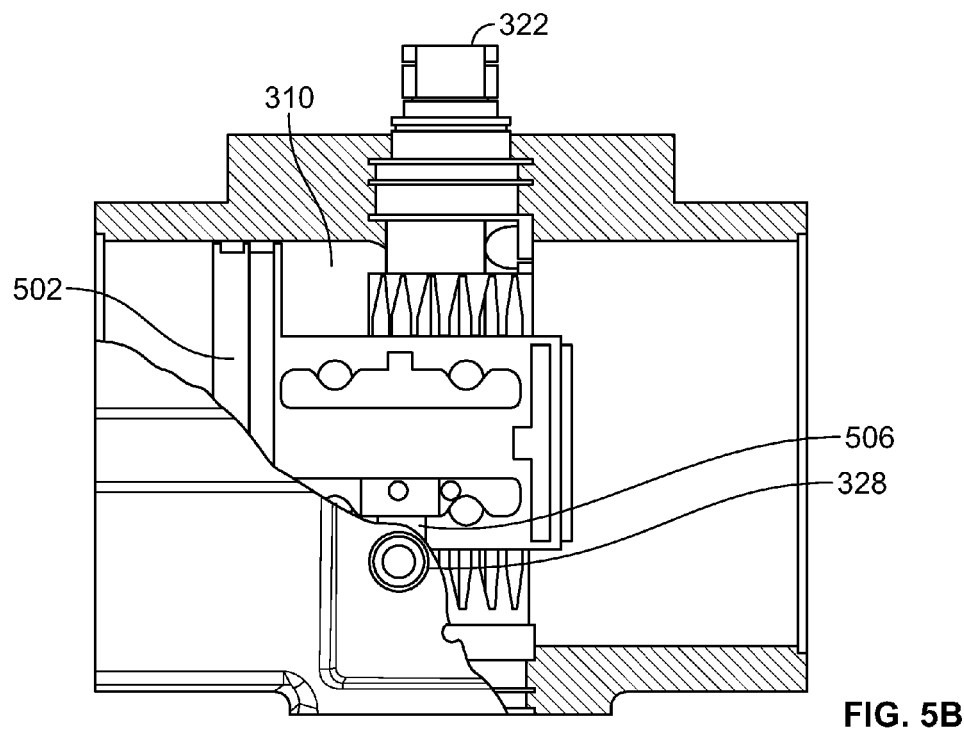
Figure 5C:
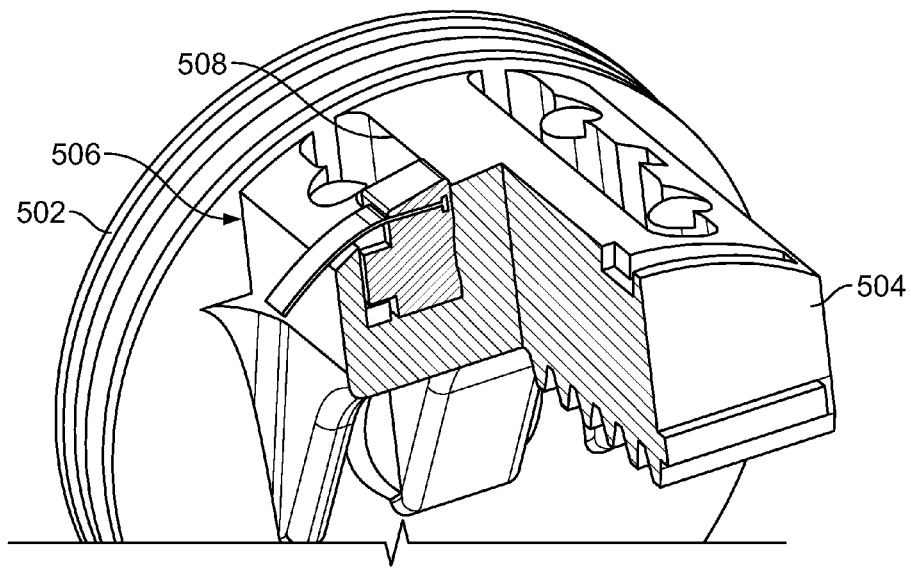
Figure 5D:
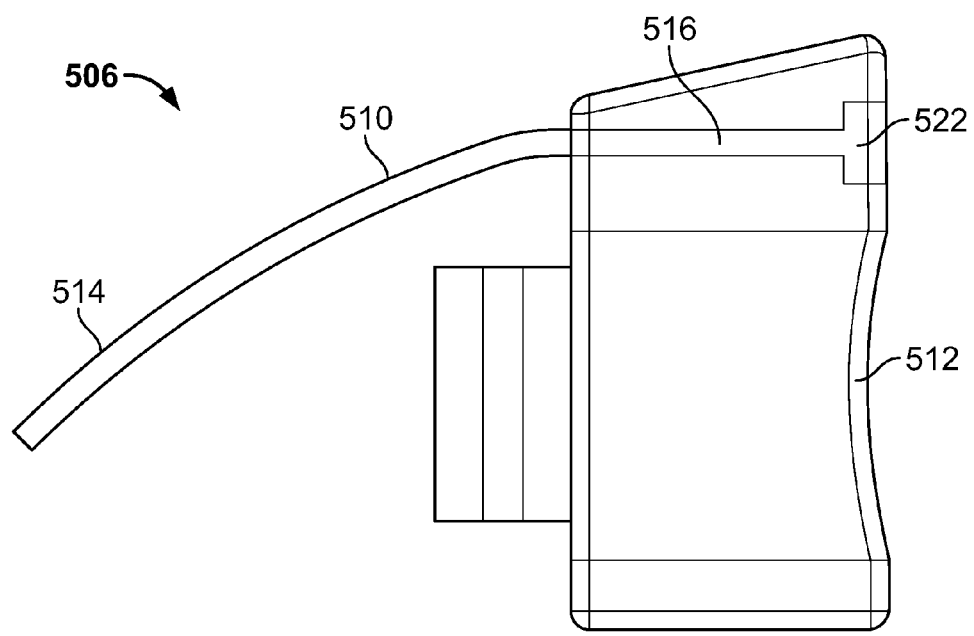
Figure 5E:
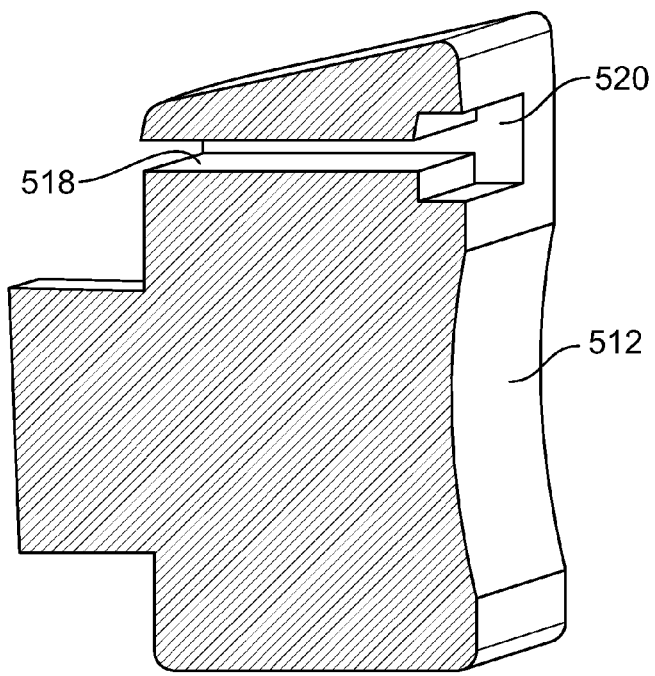

As most clearly shown in FIGS. 5C and 5D, the damper 506 is disposed (e.g., via press-fit, interference fit, a fastener, etc.) within a slot or opening 508 of the body portion 504 of the piston 502. Referring to FIGS. 5C and 5D, the damper 506 includes a flexible member or strip 510 coupled to a holder 512 such that a portion of the flexible member can bend or deflect. The flexible member 510 and/or the holder 512 may be made of a metal material, an elastomeric material, a plastic material, and/or any other suitable material. As shown, the flexible member 510 comprises an elongate portion 514 and a base portion 516. The holder 512 includes a slot 518 having a recess 520 that is larger than the slot 518 (e.g. to provide a T-shaped profile) to matably receive an end 522 (e.g., a T-shaped end) of the base portion 516. In other examples, the flexible member 510 and the holder 512 may be integrally formed as a unitary piece or structure via, for example, over molding, injection molding, etc. In yet other examples, a second damper may be disposed within the slot 508 of the body portion 504 adjacent the damper 506 to increase the length of the stroke for which the damper 506 restricts or prevents (i.e., blocks) fluid flow to the first port 328.

FIG. 5B illustrates the damper 506 in a blocking position. As shown, in operation, the piston 502 moves the damper 506 through a full stroke of the actuator 300. However, the damper 506 blocks the first port 328 when the piston 502 moves toward the valve shaft 322 to substantially restrict fluid flow between the inner chamber 310 and the first port 328 over only a predetermined portion of the full stroke of the actuator 300 (e.g., 20% of a closing stroke) as the piston 502 moves toward the valve shaft 322. As noted above, the example damping apparatus 500 provides a flow restrictor (e.g., the flow restrictor 346) and a one-way valve (e.g., the example one-way valve 350) of FIG. 3 integrally formed with the damper 506.

When the damper 506 is in the blocking position, fluid may be supplied to the inner chamber 310 via the first fluid pathway 342 and the first port 328. In particular, the pressurized fluid causes the flexible member 506 (e.g., the elongate portion 514) to deflect or move away from the first port 328 when pressurized fluid is provided in the inner chamber 310 via the first pathway 342. Thus, the flexible member 506 provides a one-way valve to allow fluid flow within the inner chamber 310 when the flexible member 506 is in the blocking position and pressurized fluid is provided via the first pathway 346.

As the pressurized fluid in the inner chamber 310 is removed or exhausted, the piston 502 moves toward the valve shaft 322. As the piston 502 moves toward the valve shaft 322, the fluid in the inner chamber 310 flows between the first port 328 and the vent 352 via the first fluid pathway 342 for a first predetermined length of the stoke (e.g., 80% of the stroke) without restriction (i.e., the damper 506 is away from the first port 328).

However, as the piston 502 moves toward the valve stem 322 over a second predetermined length of the stroke (e.g., the remaining 20% of the stroke), the piston 502 moves the damper 506 in a position that blocks the first port 328. The pressure of the pressurized fluid in the inner chamber 310 causes the flexible member 510 to deflect or move toward the first port 328 to substantially restrict (e.g., obstruct) fluid flow through the first fluid pathway 342. In this manner, the damper 506 reduces the rate of fluid flow to the vent 352 via the first fluid pathway 342 when the damper 506 is blocking or impeding fluid flow to the first port 328. In other words, the fluid flow between the inner chamber 310 and the first port 328 when the damper 506 is blocking the first port 328 is less than the fluid flow between the inner chamber 310 and the first port 328 when the damper 502 is positioned away from the first port 328. In this manner, the damping apparatus 500 provides partial stroke damping as the piston 502 and the second piston (not shown) move toward the valve shaft 322 (e.g., a closed position of a valve operatively coupled to the actuator 300.

Additionally, the second port 330 and/or the second fluid pathway 348 shown in FIG. 3 are not required. Thus, although not shown, in other examples, the example damping apparatus 500 may be used to provide partial stroke damping to, for example, the actuator 102 of FIGS. 1A and 1B. For example, the piston 120 may be replaced with the example piston 502 having the example damping apparatus 500. Thus, in other examples, the actuator 102 of FIGS. 1A and 1B may be retrofit with the example damping apparatus 500.

Figure 6A:
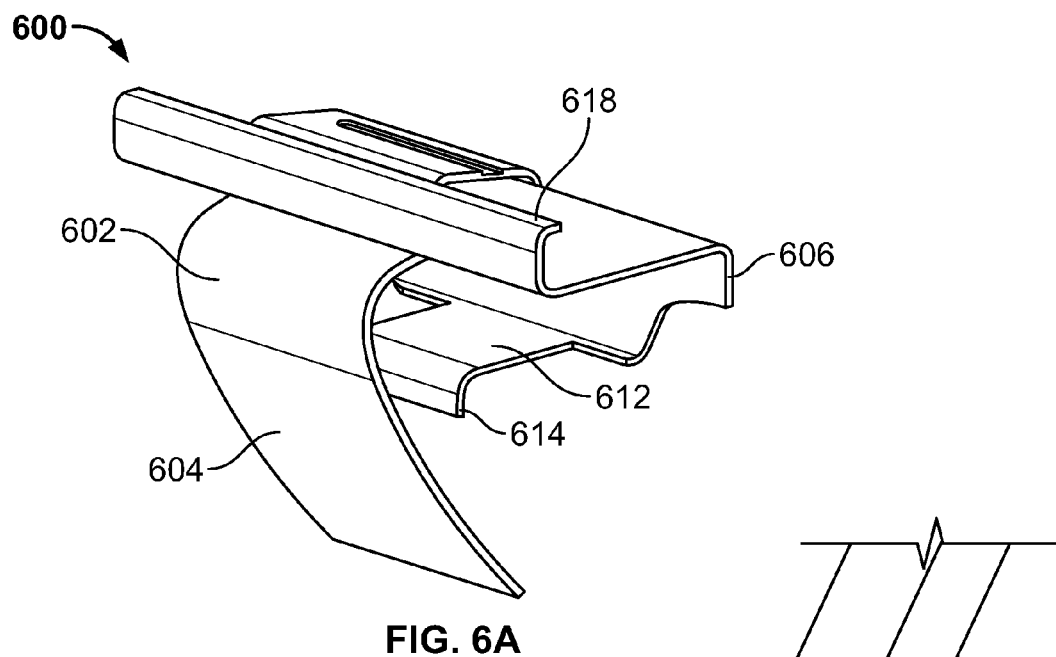
FIGS. 6A-6B illustrate yet another example damping apparatus described herein that can be used to implement the example actuator of FIGS. 3A-3B.
Figure 6B:
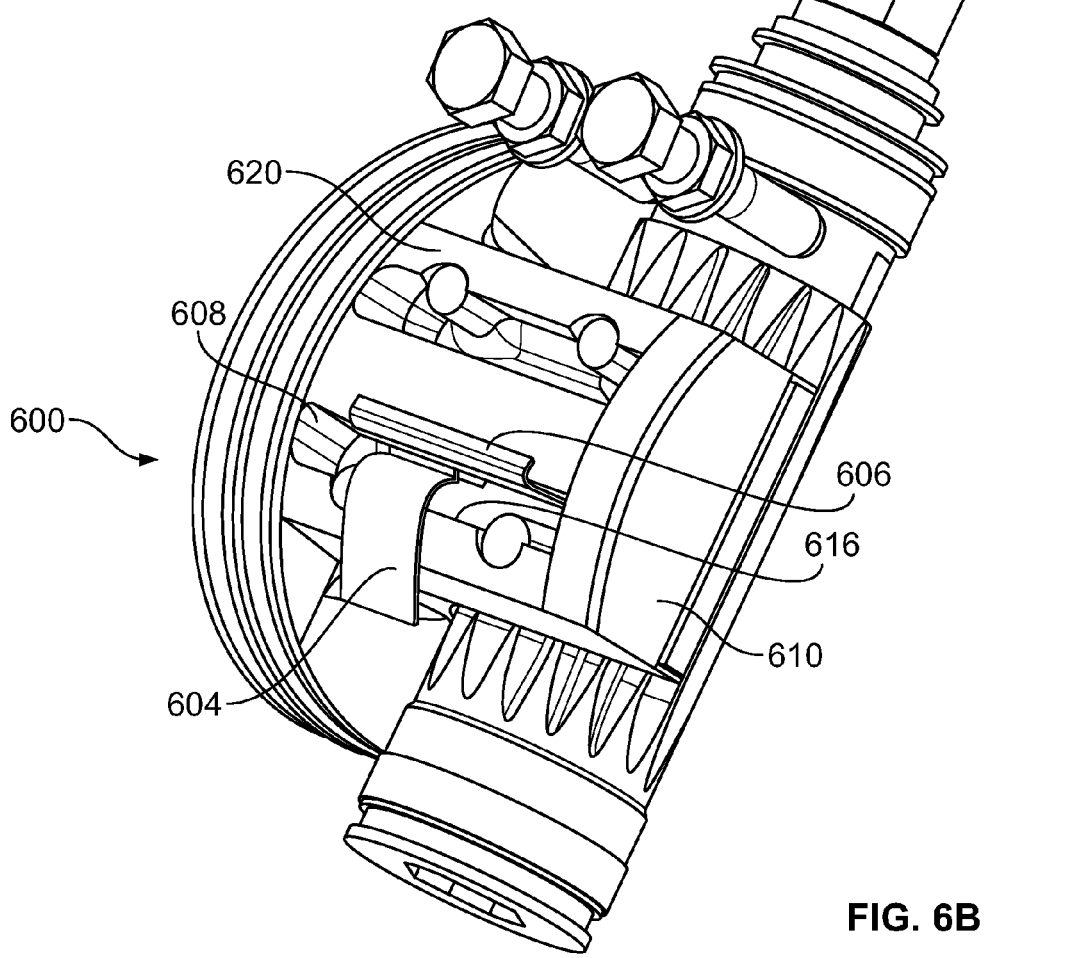

FIGS. 6A and 6B illustrate another example damping apparatus 600 described herein. Referring to FIGS. 6A and 6B, the damping apparatus 600 includes a damper or blocking element 602. In this example, the damper 602 is a spring 604 coupled to a spring holder or clip 606. The spring 604 is depicted as a leaf spring that can be made of metal, plastic, and/or any other suitable material. The spring holder 606 is disposed within a slot or opening 608 of a piston 610 via press fit or interference fit to couple the spring 604 to the piston 610.

The spring holder 606 includes a lower clip portion 612 that has a surface 614 protruding from the lower clip portion 612. Additionally, the opening 608 is recessed and shaped (e.g., tapered) to matably receive the spring holder 606 so that when disposed within the opening 608, the surface 614 engages a surface 616 of the opening 608 such that the lower clip portion 612 is biased or compressed toward an upper clip portion 618 of the spring holder 606 to couple the spring 604 to the piston 610. Additionally, the upper clip portion 618 engages a surface 620 of the piston 610 to guide or maintain the position of the spring 604.

The spring holder 606 is disposed along a portion of the opening 608 such that the spring 604 blocks the first port 328 as the piston 610 moves over a portion of a stroke of the actuator 300. For example, in operation, the spring 604 blocks the first port 328 over a partial or end portion of a closing stroke. The operation the example damping apparatus 600 is similar to the function or operation of the example damping apparatus 500 described above in connection with FIGS. 5A-5E and, thus, will not be repeated. Instead, the interested reader is directed to the description described above in connection with FIGS. 5A-5E.

Figure 7A:
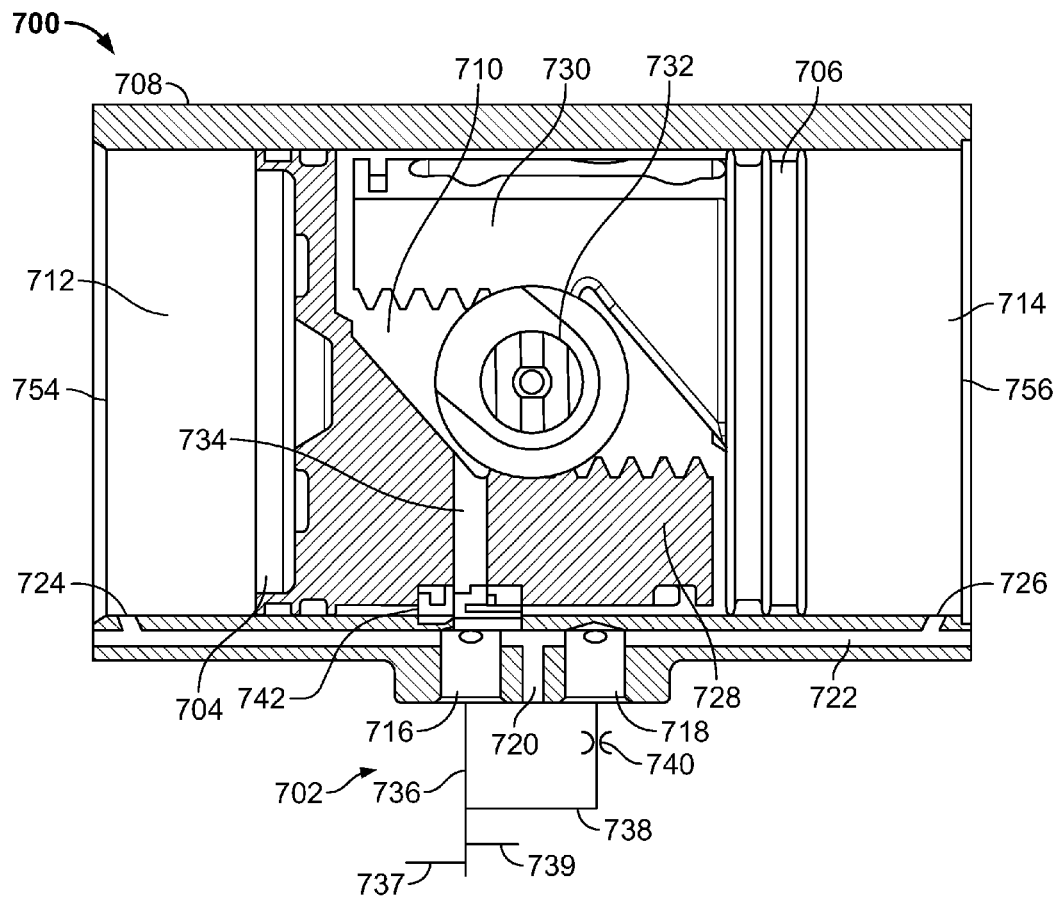
FIGS. 7A-7C illustrate yet another example actuator having a damping apparatus described herein.
Figure 7B:
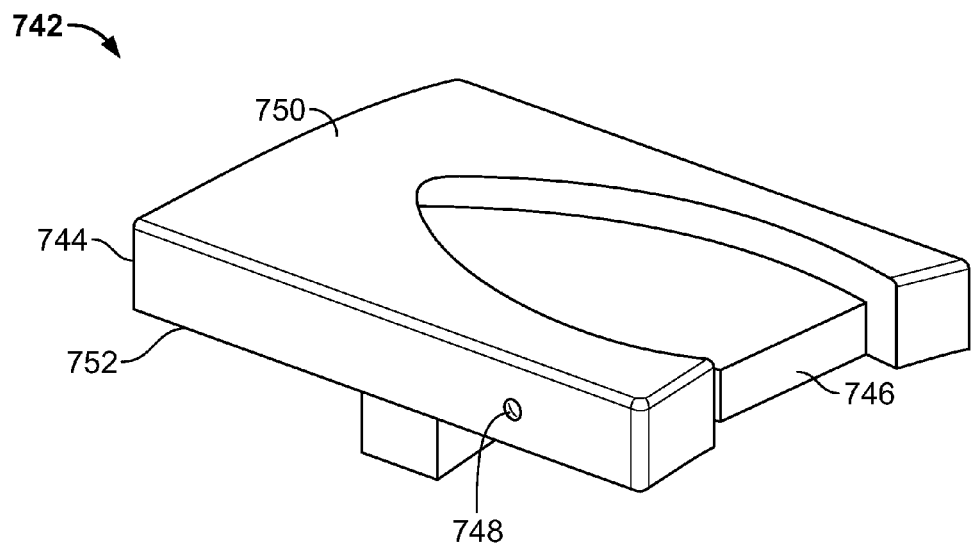
Figure 7C:
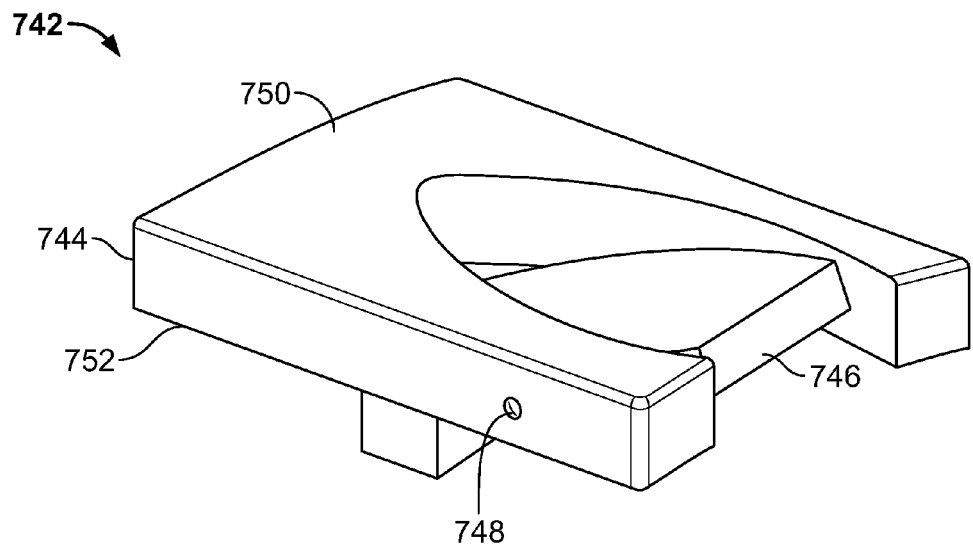

FIGS. 7A-7C illustrates a rotary valve actuator 700 having another example damping apparatus 702 described herein. In this example, the actuator 700 is a double-acting actuator and includes a first piston 704 and a second piston 706 disposed within a housing 708 to define an inner chamber 710 and respective outer chambers 712 and 714. The housing 708 includes a first port 716 and a second port 718 in fluid communication with the inner chamber 710 and a third port 720 fluidly coupled to the outer chambers 712 and 714 via a passageway 722 (e.g., integrally formed with the housing 708) and respective openings 724 and 726. The pistons 704 and 706 include respective body or rack portions 728 and 730 operatively coupled to a valve shaft 732. The body portion 728 of the first piston 704 includes an opening 734 to fluidly couple the first port 716 to the inner chamber 710 when the first piston 704 is positioned within the housing 708 such that the opening 734 is aligned with the first port 716 (e.g., when the first piston 704 is in a first or closed position shown in FIG. 7A).

In this example, the damping apparatus 702 includes a first fluid pathway 736 fluidly coupled to the inner chamber 710 via the first port 716 and a second fluid pathway 738 fluidly coupled to the inner chamber 710 via the second port 718. The first fluid pathway 736 fluidly couples the inner chamber 710 to a fluid supply source 737 and a vent 739. The second fluid pathway 738 fluidly couples the inner chamber 710 to the vent 739 and includes a flow restrictor 740 to reduce or restrict the fluid flow rate through the second fluid pathway 738. More specifically, fluid flow through the second fluid pathway 738 when the damping apparatus 702 is blocking fluid flow to the first port 716 is less than the fluid flow between the inner chamber 710 and the first port 716 when the damping apparatus 702 is not blocking fluid flow to the first port 716.

Referring also to FIGS. 7B and 7C, in this example, the damping apparatus 702 includes a damper or a blocking element 742 (e.g., a flow control device) coupled to the first piston 704 such that the damper 742 aligns with the opening 734 of the first piston 704. The example damper 742 includes a body or housing 744 having a flap or movable member 746. As shown, the movable member 746 is pivotally coupled to the housing 744. A biasing element 748 (e.g., a spring) biases the movable member 746 toward the housing 744 so that the damper 742 is in a closed position as shown in FIG. 7B. FIG. 7C illustrates the damper 742 in an open position. When coupled to the first piston 704, a first face 750 of the housing 744 faces the first port 716 and a second face 752 of the housing 744 faces the opening 734 of the first piston 704.

In operation, the inner chamber 710 receives pressurized fluid from the fluid supply source 737 via the first fluid pathway 736. If the first piston 704 is in the position shown in FIG. 7A, the pressurized fluid from the fluid supply source 737 causes the movable member 746 to move to the open position as shown in FIG. 7C to allow fluid flow to the inner chamber 710 via the first port 716 and the opening 734 of the first piston 704. The pressurized fluid in the inner chamber 710 causes the pistons 704 and 706 to move in a rectilinear motion in a direction away from the valve shaft 732, causing the valve shaft 732 to rotate in a first direction (e.g., a counterclockwise direction). As the first piston 704 moves away from the valve shaft 732, the damper 742 moves away from the first port 716 and the pressurized fluid continues to flow in the inner chamber 710 via the first fluid pathway 736 and the first port 716 (e.g., around the body portions 728 and 730 of the respective pistons 704 and 706). The fluid in the outer chambers 712 and 714 is removed or vented via the respective openings 724 and 726 and the passageway 722 as the pistons 704 and 706 move toward respective surfaces 754 and 756 of the housing 708.

The pistons 704 and 706 cause the valve shaft 732 to rotate in a second direction (e.g., a clockwise direction) when the pistons 704 and 706 move toward the valve shaft 732. To move the pistons 704 and 706 toward the valve shaft 732, the pressurized fluid is provided in the outer chambers 712 and 714 via the third port 720 and the passageway 722, and the pressurized fluid in the inner chamber 710 is removed or exhausted. As the pistons 704 and 706 move toward the valve shaft 732, the pressurized fluid in the inner chamber 710 flows to, for example, the atmosphere via the first port 716 over a portion of the piston stroke for which the damper 742 does not align with or block the first port 716. Due to the flow restrictor 740 in the second fluid pathway 738, the fluid in the inner chamber 710 flows primarily between the inner chamber 710 and the first port 716 because there is less fluid flow resistance in the first fluid pathway 736 when the damper 742 is not blocking the first port 716.

As the pistons 704 and 706 move toward the valve shaft 732 and the damper 742 aligns with or blocks the first port 716, the pressurized fluid in the inner chamber 710 acts on the second face 752 of the movable member 746 and causes the movable member 746 to move to the closed position shown in FIG. 7C. Thus, in the closed position, the damper 742 substantially restricts or prevents fluid flow through the first port 716. As a result, pressurized fluid in the inner chamber 710 is removed or vented primarily via the second port 718 when the damper 742 blocks the first port 716 as the pistons 704 and 706 move toward the valve shaft 732. With the damper 742 in the closed position, the flow restrictor 740 restricts the rate of fluid flow through the second fluid pathway 738. More specifically, fluid flow through the second fluid pathway 738 when the damper 742 is blocking fluid flow to the first port 716 is less than the fluid flow between the inner chamber 710 and the first port 716 when the damper 742 is spaced away from or not blocking the first port 716.

Thus, in operation, the pressurized fluid in the inner chamber 710 provides a cushion effect to reduce the speed of the pistons 704 and 706 as the damper 742 moves and aligns with the first port 716 over only a partial stroke of the actuator 700. For example, such a partial stroke may be 20 percent of a closing stroke. Also, when the damper 742 is aligned with or blocking the first port 716, the damper 742 provides a one-way valve to allow fluid flow in the inner chamber 710 via the first port 716 and substantially prevent fluid flow from the inner chamber 710 to the vent via the first port 716. In other words, as noted above, the example damping apparatus 702 provides a one-way valve function that is integrally formed with the damper 742.

Figure 8:
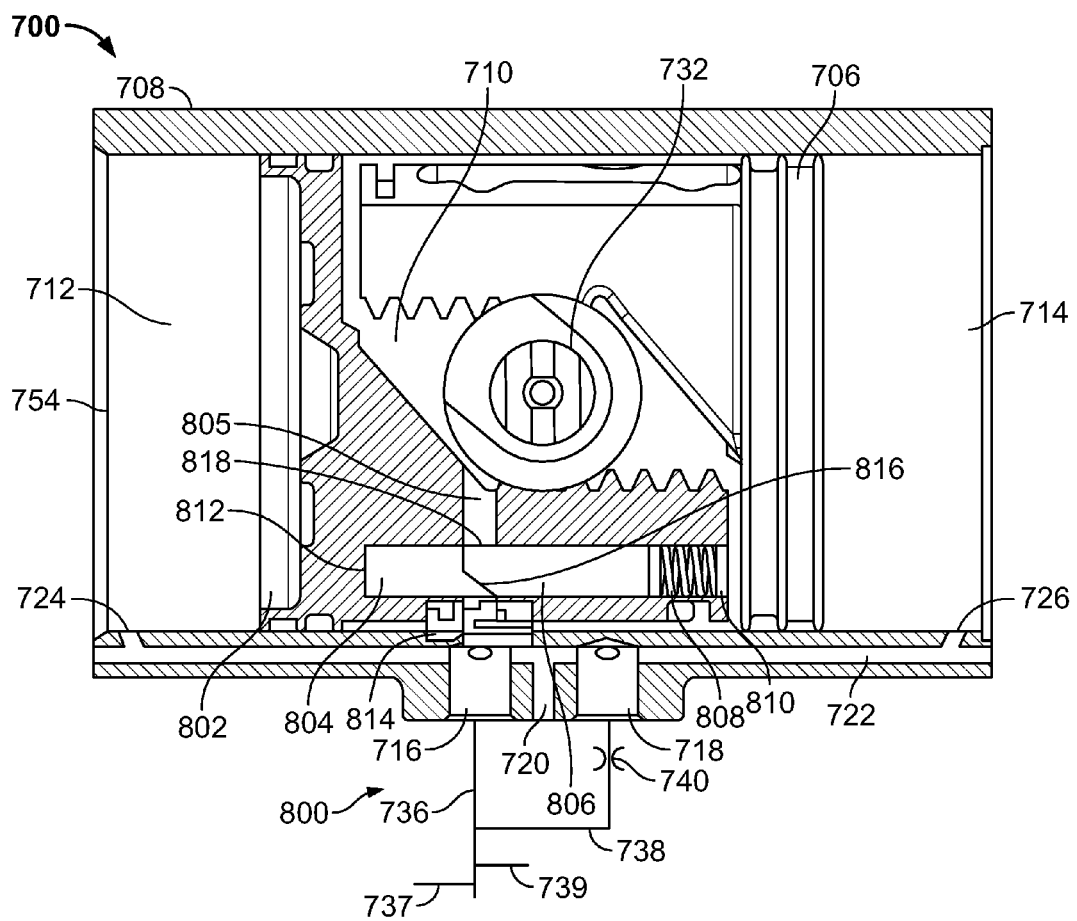
FIG. 8 illustrates another example damping apparatus described herein that can be used to implement the example actuator of FIGS. 7A-7C.

FIG. 8 illustrates another example damping apparatus 800 described herein that may be used to implement the rotary valve actuator 700 of FIG. 7A. In this example, the actuator 700 includes a piston 802 having a bore 804 that is substantially perpendicular to an opening 805 of the piston 802. The opening 805 fluidly couples the first port 716 to the inner chamber 710 when the opening 805 aligns with the first port 716.

In this example, the damping apparatus 800 includes a damper or rod 806 (e.g., a flow control assembly) slidably disposed within the bore 804 of the piston 802. A biasing element 808 is disposed within the bore 804 between a spring seat 810 and the rod 806 to bias the rod 806 toward a surface 812 of the piston 802. A housing 814 having an aperture (not shown) therethrough is coupled within the opening 805 of the piston 802 and fluidly couples the first port 716 and the opening 805 when the aperture is aligned with the first port 716.

In operation, a pressurized fluid is provided in the inner chamber 710 via the first port 716 and the opening 734. When the aperture of the housing 814 aligns with the first port 716, the housing 814 directs the pressurized fluid within the opening 805. The pressurized fluid engages or acts on a tapered surface or edge 816 of the rod 806, thereby causing the rod 806 to move in a direction opposite a force exerted by the biasing element 808. The piston 802 moves toward the surface 754 as the inner chamber 710 receives pressurized fluid. The pressurized fluid continues to flow through the first port 716 when the piston 802 and, thus, the housing 814 move away from the first port 716.

To move the piston 802 toward the valve shaft 732 (e.g., a closed position), pressurized fluid is provided in the outer chambers 712 and 714 via the third port 720 and the passageway 722, and the pressurized fluid in the inner chamber 710 is removed or exhausted. As the piston 802 moves toward the valve shaft 732, the pressurized fluid in the inner chamber 710 flows to, for example, the atmosphere via the first port 716 and the first fluid pathway 736 over a portion of the stroke of the actuator 700 in which the housing 814 (and the rod 806) is away from (e.g., does not align with or block) the first port 716.

As the piston 802 moves toward the valve shaft 732 and the housing 814 aligns with the first port 716, a face or surface 818 of the rod 806 prevents fluid flow between the inner chamber 710 and the first port 716. Instead, the pressurized fluid in the inner chamber 710 is removed or vented via the second port 718 over a portion of the stroke of the actuator 700 for which the rod 806 blocks the first port 716 as the piston 802 moves toward the valve shaft 732. The flow restrictor 740 restricts fluid flow through the second fluid pathway 738 such that the fluid flow through the second fluid pathway 738 is less than the fluid flow between the inner chamber 710 and the first port 716 when the housing 814 is away from or not blocking the first port 716. As a result, the pressurized fluid in the inner chamber 710 is vented at a reduced or slower rate and provides a cushion effect or damping to reduce the speed (i.e., slow the movement) of the piston 802 as the housing 814 and the rod 806 align with or block fluid flow to the first port 716 over only a portion of the stroke of the actuator 700.

FIGS. 9-17 illustrate other example damping apparatus described herein that may be used to provide partial stroke damping to, for example, the actuator 102 of FIGS. 1A and 1B. In yet another example, the actuator 102 of FIGS. 1A and 1B may be retrofit with the example damping apparatus 900-1600 described in FIGS. 9-16, respectively. For example, the pistons 120 and 122 of the actuator 102 of FIGS. 1A and 1B may be replaced with the example pistons and damping apparatus described herein in connection with FIGS. 9-16. Additionally, the damping apparatus described in FIGS. 9-16 do not require a second fluid circuit or flow path (e.g., the second fluid circuits 340 and 738 of FIGS. 3A and 7A, respectively) or a second port (e.g., the second ports 330 and 718 of FIGS. 3A and 7A, respectively) described above in connection with the example actuators 300 and 700.

Figure 9:
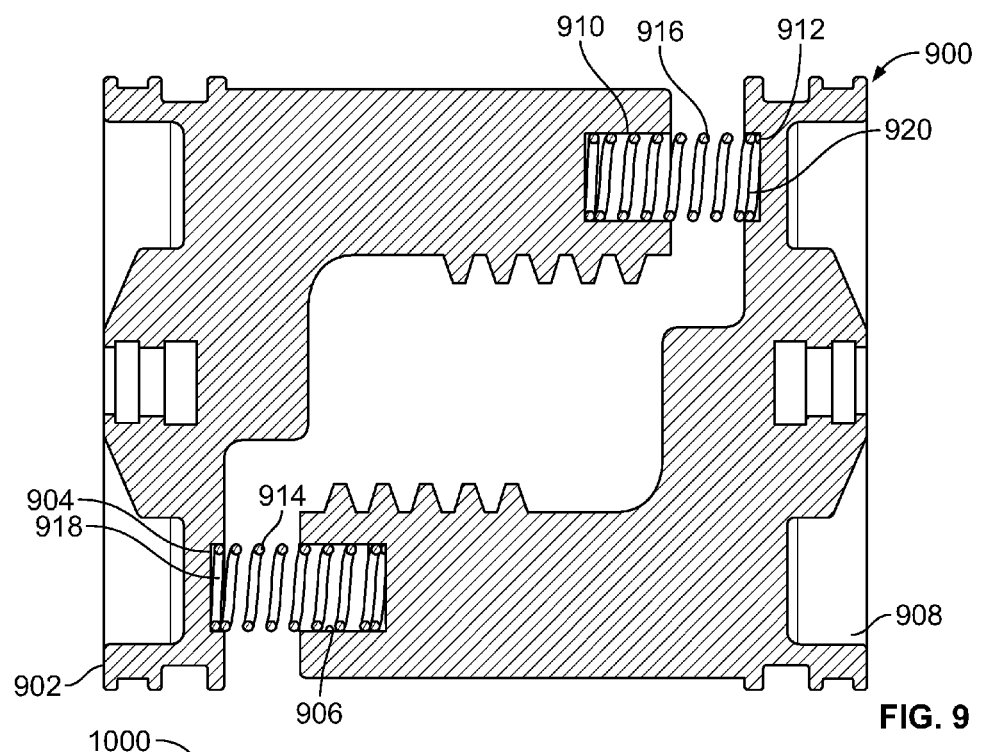
FIGS. 9-17 illustrates alternative example damping apparatus described herein that can be used to provide the actuator of FIGS. 1A-1B with partial stroke damping.
Figure 10:
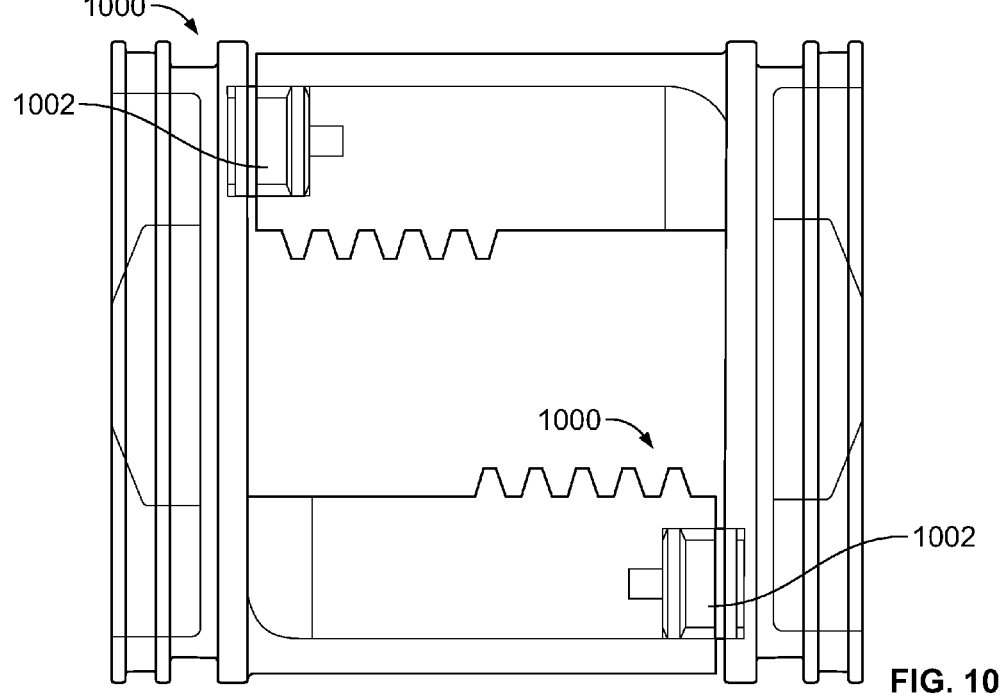

FIG. 9 illustrates another example damping apparatus 900 described herein. In this example, a first piston 902 includes a first recessed bore 904 that coaxially aligns with a first bore 906 of a second piston 908. Additionally, as shown, the first piston 902 includes a second bore 910 that coaxially aligns with a second recessed bore 912 of the second piston 908. A first biasing element 914 is disposed within the first bore 906 of the second piston 908 and a second biasing element 916 is disposed within the second bore 910 of the first piston 902.

In operation, as the pistons 902 and 908 move away from each other (e.g., an open position), the damping apparatus 900 does not provide damping. In other words, the first recessed bore 904 is spaced away from or does not engage a first end 918 of the first biasing element 914 and the second recessed bore 912 is spaced away from or does not engage a first end 920 of the second biasing element 916. Also, the damping apparatus 900 does not provide a damping for a first portion of the stroke for which the first and second pistons 902 and 908 are moving toward each other and when the first piston does not engage the first biasing element 914 and the second piston 908 does not engage the second biasing element 916.

The first recessed bore 904 engages the first end 918 of the first biasing element 914 and the second recessed bore 912 engages the first end 920 of the second biasing element 916 to activate the damping apparatus 900 over only a portion of the stroke for which the first piston 902 moves toward the second piston 908. The biasing elements 914 and 916 exert respective forces on the pistons 902 and 908 that increase significantly when the pistons 902 and 908 move toward each other. The biasing elements 914 and 916 exert forces that increase as the biasing elements 914 and 916 compress as the pistons 902 and 908 move toward each other (e.g., to a closed position). In turn, the forces exerted by the biasing elements 914 and 916 increases significantly to reduce the speed of the pistons 902 and 908 as the pistons 902 and 908 move toward each other. Thus, the biasing elements 914 and 916 increasingly slow the speed of the pistons 902 and 908 as the pistons move closer to each other.

The biasing elements 914 and 916 can have a linear spring rate or constant or a non-linear spring rate or constant. As shown in this example, the biasing elements 914 and 916 are coil springs. However, the example biasing elements 914 and 916 are not limited to coil springs as shown in FIG. 9 and may be any suitable biasing elements. For example, referring to FIG. 10 the damping apparatus 1000 may instead be a biasing element 1002 such as, for example, a bellows spring, a bellows type spring seal, a shock absorber, a mechanical seal, an air spring, etc. and/or any other suitable biasing element(s).

Figure 11:
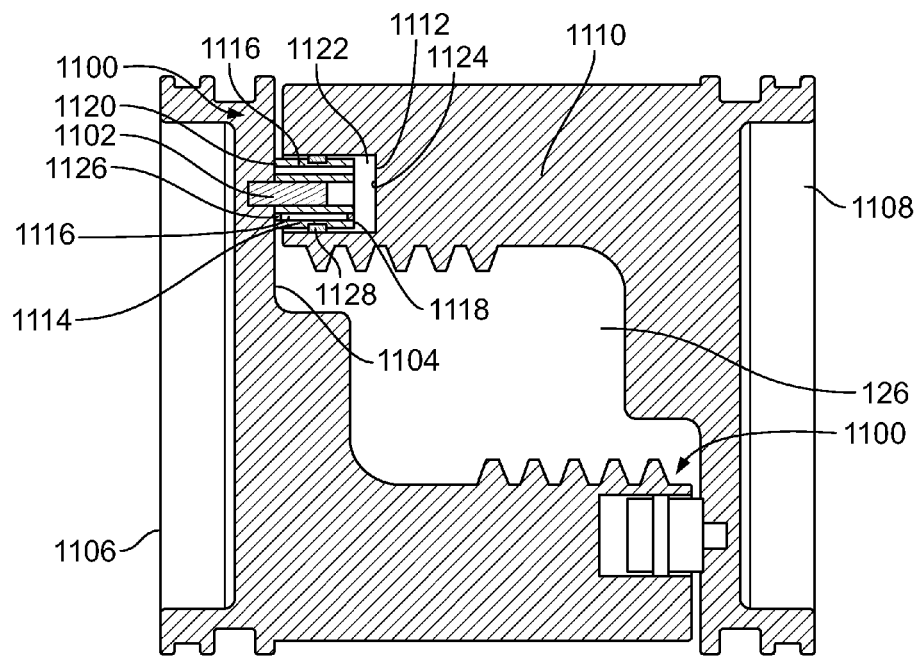
Figure 12:
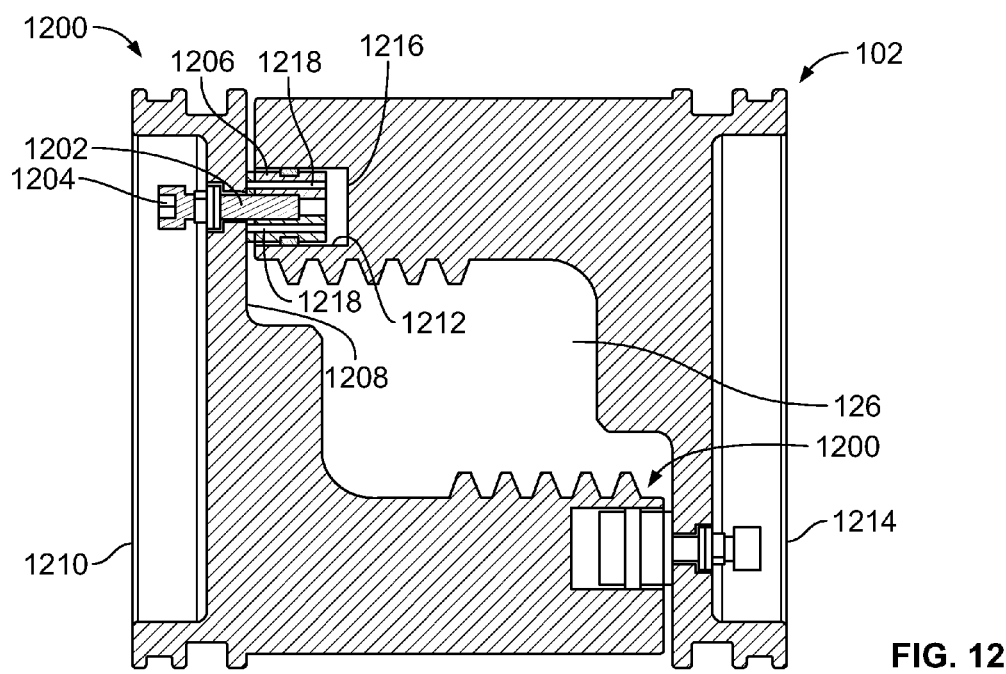

In yet other examples, damping apparatus may be non-mechanical biasing elements such as, for example, the damping apparatus 1100 and 1200 of FIGS. 11 and 12, respectively.

Referring to FIG. 11, the damping apparatus 1100 includes an air spring or shock absorber 1102 coupled to a surface 1104 of a first piston 1106 and extending or protruding from the surface 1104 toward a second piston 1108. The second piston 1108 includes a body portion 1110 having a bore 1112 coaxially aligned with, and sized to slidably receive, the air spring 1102. The air spring 1102 has a cylindrically-shaped body 1114 that includes channels or fluid pathways 1116 to fluidly couple a first end 1118 of the body 1114 and a second end 1120 of the body 1114. When coupled within the bore 1112, the air spring 1102 and the bore 1112 define a fluid chamber 1122.

In operation, the inner chamber 126 of the actuator 102 receives pressurized fluid to move the pistons 1106 and 1108 away from each other (e.g., to an open position). When the air spring 1102 is spaced away from the bore 1112, the bore 1112 receives pressurized fluid from the inner chamber 126 of the actuator 102.

The damping apparatus 1100 does not provide damping when the air spring 1102 is spaced away from or does not engage the second piston 1108. Also, the damping apparatus 1100 does not provide a damping for a first portion of the stroke for which the first and second pistons 1106 and 1108 are moving toward each other and when the air spring 1102 does not engage (i.e., is not received by) the bore 1112 of the second piston 1108. Instead, the first piston 1106 moves the air spring 1102 within the bore 1112 to activate the damping apparatus 1100 for only a second portion of the stroke. Specifically, the first piston 1104 moves the air spring 1102 within the bore 1112 between a first position and a second position toward a surface 1124 of the bore 1112 to compress the fluid in the chamber 1122. As a result, the pressure of the fluid in the chamber 1122 increases to provide a significantly greater resistance or force in a direction toward the first piston 1106.

Also, the fluid in the chamber 1122 bleeds to the inner chamber 126 via the channels 1116 of the air spring 1100. The channels 1116 have a relatively small diameter to substantially restrict fluid flow between the first end 1118 (e.g., the chamber 1122) and the second end 1120 (e.g., the inner chamber 126) of the air spring 1100. Thus, the air spring 1102 provides a damping or cushion effect to reduce the speed (i.e., slow the movement) of the first piston 1106 during only a portion of the stroke of the actuator 102 for which the air spring 1102 moves within the bore 1112, thereby providing partial stroke damping. A plug 1126 may be coupled to at least one of the channels 1116 to vary the bleed rate between the chamber 1122 and the inner chamber 126. Additionally, the air spring 1102 may include a seal 1128 to prevent fluid leakage past the body portion 1114 of the air spring 1102. In this example, the second piston 1106 also includes the damping apparatus 1100 to provide additional damping (i.e., to slow the movement) over only a portion of the stroke.

Referring the FIG. 12, the example damping apparatus 1200 is also an air spring or shock absorber 1202 similar to the air spring 1102 of FIG. 11. However, the air spring 1202 of FIG. 12 includes an adjustable member 1204 to adjust or vary the damping to be provided by the damping apparatus 1200. The adjustable member 1204 (e.g., a threaded fastener) may be adjusted to move or position a cylindrically-shaped body portion 1206 of the air spring 1202 relative to a surface 1208 of a first piston 1210. For example, the adjustable member 1204 may be adjusted to position the body portion 1206 further away from the second surface 1208 of the first piston 1210. In this manner, the body portion 1206 of the air spring 1202 will move closer to a surface 1216 of the bore 1212 when the first piston 1210 and a second piston 1214 move toward each other and the air spring 1202 is received by the bore 1212. As a result, the fluid within the bore 1212 is compressed to provide a force toward the first piston 1210 that is greater than a force provided by the compressed fluid in the bore 1212 when the body portion 1206 is positioned closer to or adjacent the surface 1208 of the first piston 1210 as shown, for example, in FIG. 12. Thus, adjusting the position of the body portion 1206 within the bore 1212 varies the bleed rate of the fluid between the bore 1212 and the inner chamber 126 of the actuator 102 via channels 1218 of the body portion 1206. Additionally, as a result, the amount or length of the portion of the stroke for which the damping apparatus 1200 provides a damping may also be adjusted because the body portion 1206 may be positioned to move within the bore 1212 a greater distance toward the surface 1216 than, for example, the position shown in FIG. 12. In this example, the second piston 1214 also includes the damping apparatus 1200 to provide additional damping over only a portion of the stroke.

Figure 13:
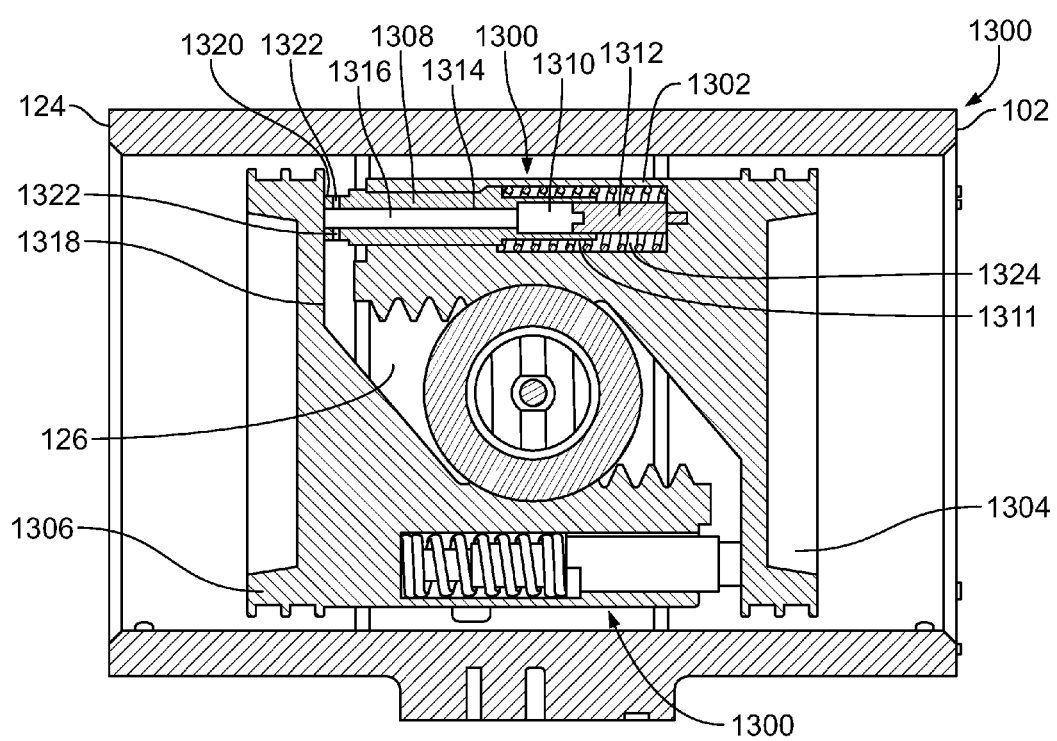

FIG. 13 illustrates another example damping apparatus 1300 described herein that may be used to implement, for example, the actuator 102 of FIGS. 1A and 1B. In this example, the example damping apparatus 1300 is disposed within a bore 1302 of a first piston 1304. A second piston 1306 may also include a damping apparatus 1300. The damping apparatus 1300 includes a body or cylinder 1308 slidably coupled or disposed within the bore 1302. The cylinder 1308 includes a bore or chamber 1310 to slidably receive a rod 1312 (e.g., a piston) at a first end 1311 of the cylinder 1308 and has a second end 1320 protruding from the first bore 1302 of the first piston 1304.

The cylinder 1308 includes an opening 1314 to form a fluid pathway 1316 between the chamber 1310 and the inner chamber 126 when a surface 1318 of the second piston 1306 is spaced away from the second end 1320 of the cylinder 1308. Also, the cylinder 1308 includes apertures 1322 adjacent the second end 1320 to fluidly couple the chamber 1310 and the inner chamber 126 of the actuator 102 when the surface 1318 of the second piston 1306 engages the second end 1320 of the cylinder 1308. The diameter of the apertures 1322 is smaller than the diameter of the fluid pathway 1316, which is smaller than the diameter of the chamber 1310. A biasing element 1324 is disposed within the bore 1302 to bias the cylinder 1308 away from the rod 1312.

In operation, the chamber 1310 receives pressurized fluid via the fluid pathway 1316 when pressurized fluid is provided to the inner chamber 126 of the actuator 102. When the pressurized fluid in the inner chamber 126 is removed or exhausted, the pistons 1304 and 1306 move toward each other. The damping apparatus 1300 does not provide a damping for a first portion of the stroke for which the second piston 1306 is moving toward the first piston 1304 and for which the second piston 1306 does not engage the second end 1320 of the cylinder 1308. Instead, the damping apparatus 1300 provides a damping only for a second portion of the stroke for which the second piston 1306 engages the cylinder 1308.

More specifically, as the second piston 1306 moves toward the first piston 1304, the surface 1318 of the second piston 1306 engages the second end 1320 of the cylinder 1308 to activate the damping apparatus 1300. When actuated, the second piston 1306 causes the cylinder 1308 to move toward the rod 1312. As the cylinder 1308 moves toward the rod 1312, the pressure of the fluid in the chamber 1310 increases to provide a significantly greater resistance or force in a direction toward the second piston 1306. Additionally, the surface 1318 of the second piston 1306 substantially restricts fluid flow between the second end 1320 of the fluid pathway 1316 and the inner chamber 126 when the surface 1318 engages the second end 1320. As a result, the rod 1312 forces the fluid in the chamber 1310 to flow to the inner chamber 126 via the fluid pathway 1316 and the apertures 1322.

As noted above, because the diameter of the fluid pathway 1316 is smaller than the diameter of the chamber 1310 and the diameter of the apertures 1322 is smaller than the diameter of the fluid pathway 1316, the fluid flow to the inner chamber 126 is substantially restricted through the apertures 1322. In other words, the fluid flow between the inner chamber 126 and the chamber 1310 via the apertures 1322 (when the surface 1318 of the second piston 1306 engages the second end 1320 of the cylinder 1308) is less than the fluid flow between flow between the inner chamber 126 and the chamber 1310 via the fluid pathway 1316 when the surface 1318 is spaced away from the second end 1320.

Thus, the pressurized fluid in the chamber 1310 provides a damping or cushion effect to slow the speed of the first piston 1304 only during the portion of the stroke for which the second piston 1306 engages the cylinder 1308. In other words, the increased fluid pressure in the chamber 1310 provides damping over only a portion of the stroke of the actuator 102 for which the second piston 1306 engages the second end 1320 of the cylinder 1308. The damping apparatus 1300 of the second piston 1306 also provides partial stroke damping as the second piston 1306 moves toward the first piston 1304.

FIG. 14 illustrates yet another example damping apparatus 1400 described herein that can be used to implement, for example, the example rotary valve actuator 102 of FIGS. 1A and 1B. In this example, a first piston 1402 includes a body portion 1404 (e.g., a rack portion) having a bore 1406 to receive the damping apparatus 1400. As shown, the damping apparatus 1400 includes a rod or bleed piston 1408, a biasing element 1410, and a spring seat 1412. The biasing element 1410 biases the rod 1408 toward a shoulder 1414 of the body portion 1404 formed by the bore 1406. A surface 1416 of a second piston 1418 engages an end 1420 of the rod 1408 to activate the damping apparatus 1400. The rod 1408 includes a fluid pathway 1422 to fluidly couple the inner chamber 126 of the actuator 102 and a chamber 1424 defined by the bore 1406 and the rod 1408.

In operation, the inner chamber 126 of the actuator 102 receives pressurized fluid to move the pistons 1402 and 1418 away from each other. The chamber 1424 receives pressurized fluid from the inner chamber 126 via the fluid pathway 1422. When the pressurized fluid is removed or exhausted from the inner chamber 126, the pistons 1402 and 1418 move toward each other. The damping apparatus 1400 does not provide a damping for a first portion of the stroke for which the pistons 1402 and 1418 are moving toward each other and when the surface 1416 of the second piston 1418 does not engage the rod 1408. Instead, the damping apparatus 1400 provides a damping for only a second portion of the stroke for which the second piston 1418 engages the rod 1408. Also, the pressurized fluid in the chamber 1424 flows to the inner chamber 126 via the fluid pathway 1422 substantially without restriction when the second piston 1418 is spaced away from the rod 1408.

For the second portion of the stroke, the surface 1416 of the second piston 1418 engages the end 1420 of the rod 1408 to activate the damping apparatus 1400. The second piston 1418 engages the end 1420 to cause the rod 1408 to move between a first position and a second position in a direction toward the spring seat 1412. In turn, the rod 1408 compresses the fluid in the chamber 1424 and causes the pressure of the fluid in the chamber 1424 to increase. Also, the surface 1416 of the second piston 1418 and the end 1420 of the rod 1408 do not sealingly engage, thereby allowing fluid in the chamber 1424 to bleed or flow to the inner chamber 126 via the fluid pathway 1422 when the second piston 1418 engages the rod 1408. Also, although not shown, the end 1420 of the rod 1408 may include a channel or slot to enable fluid flow between the chamber 1424 and the inner chamber 126 when the second piston 1418 engages the rod 1408. However, such flow from the inner chamber 126 via the fluid pathway 1422 is substantially restricted or reduced due to the surface 1416 of the second piston 1418 being engaged with the opening of the fluid pathway 1422 at the end 1420 of the rod 1408.

Thus, as the second piston 1418 causes the rod 1408 to move toward the spring seat 1412, the fluid in the chamber 1424 bleeds to the inner chamber 126. As a result, the pressurized fluid in the chamber 1424 increases over a portion of the stroke for which the second piston 1418 engages the rod 1408. Thus, the damping apparatus 1400 provides a damping or cushion effect to reduce the speed of the second piston 1418 during only a portion of the stroke of the actuator 102 for which the second piston 1418 engages the rod 1408, thereby providing partial stroke damping.

FIG. 15 illustrates yet another example damping apparatus 1500 described herein. In this example, the damping apparatus 1500 is disposed within a bore 1502 of a piston 1504 to define a chamber 1506. The damping apparatus 1500 includes a movable member or rod 1508, a biasing element 1510, and a valve assembly 1512. The biasing element 1510 is disposed between the movable member 1508 and the valve assembly 1512 to bias the movable member 1508 toward a shoulder 1514 formed by the bore 1502. The movable member 1508 includes a stem portion 1516 that protrudes from the bore 1502 and which is to be engaged by a second piston (not shown). The valve assembly 1512 includes a first fluid pathway 1518 having a one-way valve 1520 (e.g., a check valve) and a second fluid pathway 1522 having a flow restrictor 1524. The flow restrictor 1524 may be adjustable to increase or decrease the restriction or the rate of fluid flow through the second fluid pathway 1522.

In operation, the chamber 1506 receives pressurized fluid via an inlet 1526 of the first fluid pathway 1518. For example, the first fluid pathway 1518 may be fluidly coupled to an outer chamber or a port of an actuator such as, for example, the outer chamber 130 and the pathway 144 of the example rotary valve actuator 102 of FIGS. 1A and 1B. The damping apparatus 1500 does not provide a damping for a first portion of the stroke for which the second piston is moving toward the piston 1504 and when the second piston does not engage the movable member 1508. Instead, the damping apparatus 1500 is activated or provides a damping over only a second portion of the stroke as the second piston moves toward the piston 1504 and engages the stem portion 1516 of the movable member 1508 to cause the movable member 1508 to move toward the valve assembly 1512. As the movable member 1508 moves toward the valve assembly 1512, the movable member 1508 compresses or reduces the volume of the fluid in the chamber 1506, thereby causing the pressure of the fluid in the chamber 1506 to increase.

Additionally, the one-way valve 1520 moves toward a seating surface 1528 to prevent fluid flow from the chamber 1506 to the inlet 1526 via the first fluid pathway 1518. Thus, as the movable member 1508 moves in a rectilinear motion toward the valve assembly 1512, the fluid in the chamber 1506 flows through the second fluid pathway 1522. The flow restrictor 1524 substantially restricts the fluid flow through the second fluid pathway 1522. As a result, the pressurized fluid in the chamber 1506 provides a damping or cushion effect to reduce the speed of the piston 1504 during the second portion of a stroke for which the second piston engages the stem portion 1516 of the movable member 1508.

Figure 16:
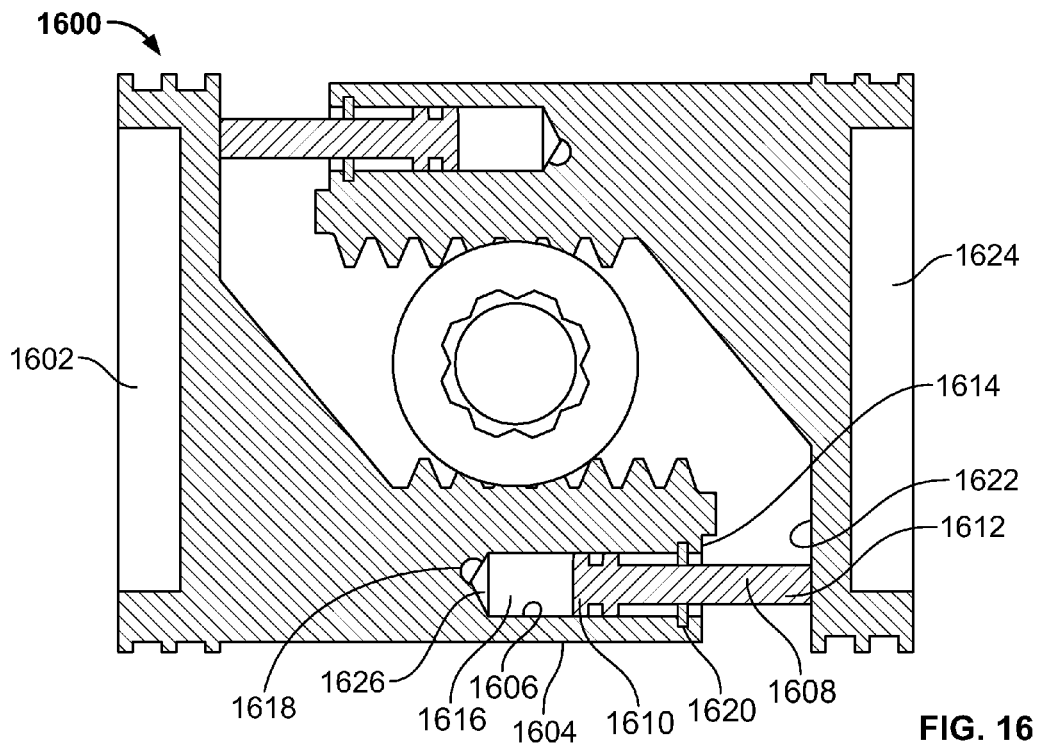

FIG. 16 illustrates yet another example damping apparatus 1600 described herein that can be used to implement or retrofit, for example, the rotary valve actuator 102 of FIGS. 1A and 1B to provide partial stroke damping. In this example, a first piston 1602 includes a body portion 1604 (e.g., a rack portion) having a first bore 1606 to slidably receive a rod 1608. The rod 1608 includes a first portion 1610 disposed within the first bore 1606 and a second portion 1612 protruding from an end 1614 of the body portion 1604. The first bore 1606 and the first portion 1610 of the rod 1608 define a chamber 1616 to hold a fluid such as, for example, a viscous fluid. The chamber 1616 is filled with the fluid via an access port 1618. A plug (not shown) is coupled to the access port 1618 and the rod 1608 includes a seal 1620 to fluidly seal the chamber 1616 and prevent fluid leakage between the chamber 1616 and an inner chamber (e.g., the inner chamber 126) of an actuator (e.g., the actuator 102). A surface 1622 of a second piston 1624 engages the second portion 1612 of the rod 1608 to activate the damping apparatus 1600 over only a portion of the stroke for which the second piston 1624 engages the rod 1608.

In operation, the first piston 1602 and the second piston 1624 move in a first position or an open stroke and a second direction or opposite the first direction or a closing stroke. As the pistons 1602 and 1624 move away from each other (e.g., an open position), the damping apparatus 1600 does not provide damping and the volume of the fluid in the chamber 1616 causes the rod 1608 to move away from a surface 1626 of the first bore 1606. Also, the damping apparatus 1600 does not provide a damping for a first portion of the stroke for which the second piston 1624 is moving toward the first piston 1602 and when the second piston 1624 does not engage the second portion 1612 of the rod 1608.

Instead, the damping apparatus 1600 is activated or provides damping over only a second portion of the stroke as the second piston 1624 moves toward the piston 1602 and the surface 1622 engages the second portion 1612 of the rod 1608 to cause the rod 1608 to move toward the surface 1626 of the first bore 1606. As the rod 1608 contacts and moves toward the surface 1626, the first portion 1610 of the rod 1608 compresses or reduces the volume of the fluid in the chamber 1616, thereby causing the pressure of the fluid in the chamber 1616 to increase. The increased pressure of the fluid in the chamber 1616 provides a cushion effect to reduce the speed of the pistons 1602 and 1624 as the pistons 1602 and 1624 move toward each and the first portion 1610 of the rod 1608 moves toward the surface 1626 over a portion of a stroke (e.g., a portion of the closing stroke), thereby providing partial stroke damping.

Figure 17:
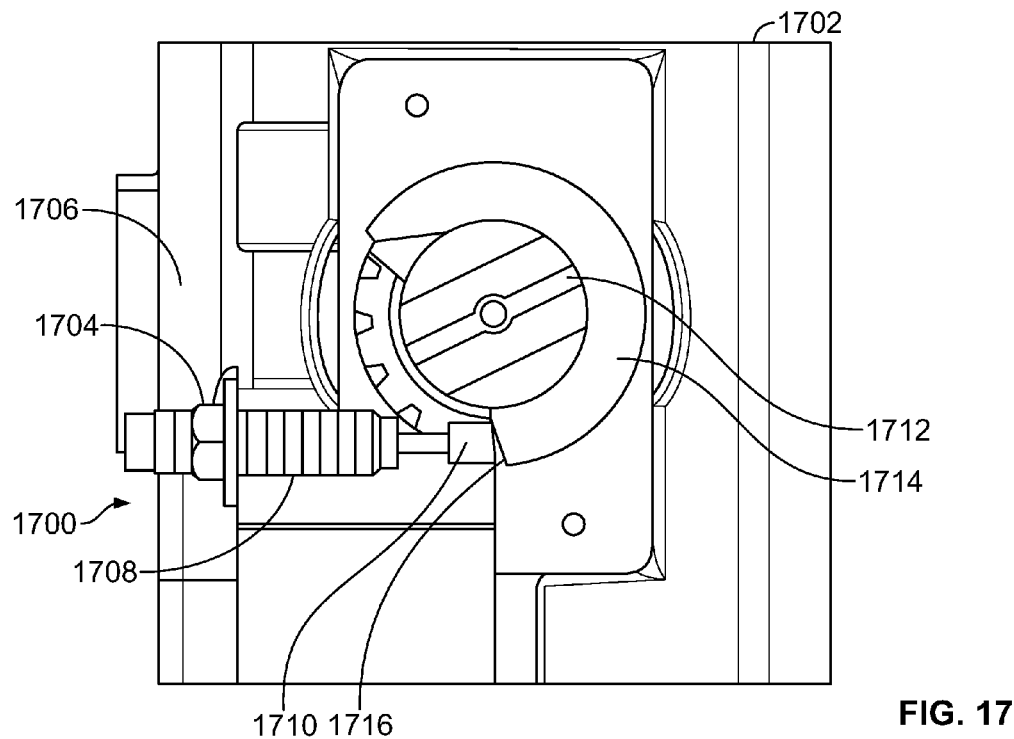

FIG. 17 illustrates another example damping apparatus 1700 described herein that provides partial stroke damping to a rotary valve actuator 1702. In this example, the damping apparatus 1700 includes a viscosity damper 1704 that is mounted to a housing 1706 of the actuator 1702. The viscosity damper 1704 includes a casing 1708 having a viscous fluid therein and a slidable piston member 1710. The actuator 1702 includes a valve shaft 1712 having a cam 1714 coupled to the valve shaft 1712 to engage the slidable piston member 1710. In this example, the cam 1714 has an arcuate or curved surface that includes an edge or surface 1716 to engage the piston member 1710 of the viscosity damper 1704. The actuator 1702 includes pistons (not shown) having rack portions (not shown) that engage a drive shaft or pinion (not shown) of the valve shaft 1712 to rotate the valve shaft 1712.

In operation, the pistons (not shown) reciprocate within the housing 1706 in a rectilinear motion to rotate the valve shaft 1712 in a first direction (e.g., a counter clockwise direction) or an opening stroke and a second direction (e.g., clockwise direction) or a closing stroke. As the pistons move toward the valve shaft 1712, the cam 1714 rotates with the valve shaft 1712 and engages piston member 1710 of the viscosity damper 1704 for only a portion of the stroke of the actuator 1702. The viscous fluid of the viscosity damper 1704 provides a cushion effect to reduce the speed of the pistons as the pistons move toward each other during a portion of a stroke for which the cam 1714 engages the piston member 1710 of the viscosity damper 1704, thereby providing partial stroke damping.

Although certain example apparatus and articles of manufacture have been described herein, the scope of coverage of this patent is not limited thereto. On the contrary, this patent covers all apparatus and articles of manufacture fairly falling within the scope of the appended claims either literally or under the doctrine of equivalents.

What is claimed is:

1. A rotary valve actuator, comprising:
   a housing containing a first piston and a second piston opposite the first piston to define an inner chamber therebetween, wherein the pistons are to move in opposite directions to rotate a shaft of the rotary valve actuator;
   a first port in fluid communication with the inner chamber and a first fluid pathway;
   a second port different than the first port, the second port in fluid communication with the inner chamber and a second fluid pathway; and
   a damper coupled to at least one of the first piston or the second piston to slow the movement of the pistons for only a portion of a stroke of the rotary valve actuator, wherein the first piston is to move the damper between a first position to enable fluid flow between the inner chamber and the first port and a second position to substantially prevent fluid flow between the inner chamber and the first port over the portion of the stroke, wherein fluid in the inner chamber is directed toward the second port when the damper is in the second position.

2. A rotary valve actuator of claim 1, wherein the damper comprises a blocking element coupled to a first body portion of the first piston.

3. A rotary valve actuator of claim 2, wherein the first fluid pathway fluidly couples the inner chamber and a vent when the blocking element is in the first position.

4. A rotary valve actuator of claim 2, wherein the first body portion has a slot to receive the blocking element.

5. A rotary valve actuator of claim 4, wherein the blocking element is coupled within the slot of the first piston via an interference fit.

6. A rotary valve actuator of claim 5, wherein the blocking element comprises a pad.

7. A rotary valve actuator of claim 2, wherein the blocking element comprises a flexible member coupled to a holder.

8. A rotary valve actuator of claim 7, wherein the flexible member comprises a spring.

9. A rotary valve actuator of claim 1, wherein the second fluid pathway includes a fluid flow restrictor so that fluid flow through the second fluid pathway when the blocking element is in the second position is less than the fluid flow between the inner chamber and the first port when the blocking element is in the first position.

10. A rotary valve actuator of claim 9, further comprising a third fluid pathway to be fluidly coupled to the second port or the first port and having a one-way valve to allow fluid flow through the third fluid pathway in a first direction and restrict fluid flow through the third fluid pathway in a second direction opposite the first direction.

11. A rotary valve actuator of claim 10, wherein the second fluid pathway fluidly couples the inner chamber to the vent when the blocking element is in the second position, and the third fluid pathway is to fluidly couple the inner chamber to a fluid supply source.

12. A rotary valve actuator of claim 2, wherein the first piston further comprises an opening within the first body portion to fluidly couple the first port and the inner chamber when the opening is aligned with the first port.

13. A rotary valve actuator of claim 12, wherein the blocking element comprises a second housing having a movable member aligned with the opening of the first piston.

14. A rotary valve actuator of claim 13, further comprising a biasing element to bias the movable member toward a closed position.

15. A rotary valve actuator of claim 14, wherein the movable member is to move to an open position to allow fluid flow in a first direction from the first port to the inner chamber when the blocking element is in the first position and pressurized fluid is provided to the inner chamber, and wherein the movable member is to move to a closed position to substantially restrict fluid flow in a second direction from the inner chamber to the first port when the inner chamber contains pressurized fluid and the blocking element is in the second position.

16. A rotary valve actuator of claim 12, wherein the first body portion of the first piston further comprises a first bore substantially perpendicular to the opening of the first piston, and wherein blocking element is disposed within the first bore.

17. A rotary valve actuator of claim 16, wherein the blocking element comprises a rod having a tapered surface that faces the first port.

18. A rotary valve actuator of claim 17, wherein the tapered surface enables the blocking element to move away from the opening and the first port to allow fluid flow in a first direction from the first port to the inner chamber when the opening of the first piston is aligned with the first port and pressurized fluid is provided in the inner chamber, and wherein the blocking element restricts fluid flow in a second direction from the inner chamber to the first port when the opening is aligned with the first port and the blocking element is in the second position.

19. A rotary valve actuator of claim 18, further comprising a biasing element disposed within the first bore to bias the blocking element toward the opening of the first piston.

20. The rotary valve actuator of claim 1, wherein the damper comprises a flexible member coupled to the first piston.

21. The rotary valve actuator of claim 20, wherein the flexible member is to flex away from the first port when the flexible member is positioned adjacent the first port and a fluid is flowing into the inner chamber via the first port.

22. The rotary valve actuator of claim 20, wherein the flexible member flexes relative to the first port to provide a one-way valve such that the flexible member moves away from the first port to allow fluid flow into the inner chamber via the first port and moves toward the first port to prevent fluid flow from the inner chamber via the first port.

* * * * *

UNITED STATES PATENT AND TRADEMARK OFFICE
CERTIFICATE OF CORRECTION

| | | |
|---|---|---|
| PATENT NO. | : 8,567,752 B2 | Page 1 of 1 |
| APPLICATION NO. | : 12/552814 | |
| DATED | : October 29, 2013 | |
| INVENTOR(S) | : Gerard ter Horst et al. | |

It is certified that error appears in the above-identified patent and that said Letters Patent is hereby corrected as shown below:

In the Claims:

Column 20, line 7 (Claim 16): Insert --the-- between "wherein" and "blocking element".

Signed and Sealed this
Sixth Day of May, 2014

Michelle K. Lee
*Deputy Director of the United States Patent and Trademark Office*